(12) United States Patent
Xu et al.

(10) Patent No.: US 11,419,025 B2
(45) Date of Patent: Aug. 16, 2022

(54) PATH SWITCHING METHOD, APPARATUS AND SYSTEM

(71) Applicant: HUAWEI TECHNOLOGIES CO., LTD., Shenzhen (CN)

(72) Inventors: Haibo Xu, Beijing (CN); Nathan Edward Tenny, San Diego, CA (US); Yiru Kuang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/635,764

(22) PCT Filed: Aug. 11, 2017

(86) PCT No.: PCT/CN2017/097022
§ 371 (c)(1),
(2) Date: Jan. 31, 2020

(87) PCT Pub. No.: WO2019/028811
PCT Pub. Date: Feb. 14, 2019

(65) Prior Publication Data
US 2021/0144606 A1 May 13, 2021

(51) Int. Cl.
*H04W 36/00* (2009.01)
*H04W 76/30* (2018.01)
(Continued)

(52) U.S. Cl.
CPC ....... *H04W 36/03* (2018.08); *H04W 36/0016* (2013.01); *H04W 74/0833* (2013.01);
(Continued)

(58) Field of Classification Search
CPC ............ H04W 36/03; H04W 74/0833; H04W 74/0891; H04W 36/0016; H04W 76/11;
(Continued)

(56) References Cited

U.S. PATENT DOCUMENTS

2011/0176476 A1 7/2011 Tsuruoka
2014/0328310 A1* 11/2014 Xu ...................... H04W 72/042
370/329

(Continued)

FOREIGN PATENT DOCUMENTS

CN 102172072 A 8/2011
CN 104284321 A 1/2015
(Continued)

OTHER PUBLICATIONS

LG Electronics Inc. et al., "Path switch scenarios," 3GPP TSG-RAN2 Meeting #96 R2-168772, Reno, U.S.A., Nov. 14-18, 2016 pp. 1-4 (Year: 2016).*

(Continued)

*Primary Examiner* — Un C Cho
*Assistant Examiner* — Lalita W Pace
(74) *Attorney, Agent, or Firm* — Rimon PC

(57) ABSTRACT

This application discloses a path switching method that includes: sending, by a first terminal, a first message to a first network device, where the first message is used to request to switch a second terminal from an indirect connection path for communicating with the first network device by using the first terminal to a direct connection path for communicating with the first network device or a second network device, or the first message is used to request to release a link between the first terminal and the second terminal, and the first network device is different from the second network device; and releasing, by the first terminal, the link between the first terminal and the second terminal. With this solution, a relay terminal can trigger switching of a remote terminal from an indirect connection path to a direct connection path, to adapt to a relay scenario more flexibly.

3 Claims, 14 Drawing Sheets

(51) Int. Cl.
*H04W 76/11* (2018.01)
*H04W 76/27* (2018.01)
*H04W 74/08* (2009.01)
*H04W 92/18* (2009.01)

(52) U.S. Cl.
CPC ............ *H04W 76/11* (2018.02); *H04W 76/27* (2018.02); *H04W 76/30* (2018.02); *H04W 92/18* (2013.01)

(58) Field of Classification Search
CPC ..... H04W 76/20; H04W 76/22; H04W 76/23; H04W 76/25; H04W 76/27; H04W 76/30; H04W 76/38; H04W 92/18; H04W 92/10
See application file for complete search history.

(56) References Cited

U.S. PATENT DOCUMENTS

| | | | |
|---|---|---|---|
| 2016/0198503 | A1 | 7/2016 | Sato et al. |
| 2017/0071028 | A1* | 3/2017 | Kuo ..................... H04W 8/06 |
| 2017/0079081 | A1* | 3/2017 | Kim ..................... H04W 76/14 |
| 2017/0317740 | A1* | 11/2017 | Basu Mallick ....... H04W 8/005 |
| 2018/0213577 | A1* | 7/2018 | Burbidge .............. H04W 76/10 |
| 2018/0295534 | A1* | 10/2018 | Huang .................. H04W 8/005 |
| 2019/0037463 | A1* | 1/2019 | Feng ..................... H04W 88/04 |
| 2019/0239147 | A1* | 8/2019 | Chun .................... H04W 48/16 |
| 2019/0320495 | A1 | 10/2019 | Kuang et al. |
| 2020/0128466 | A1* | 4/2020 | Vutukuri .............. H04W 36/30 |

FOREIGN PATENT DOCUMENTS

| | | |
|---|---|---|
| CN | 104284449 A | 1/2015 |
| CN | 105453694 A | 3/2016 |
| CN | 106470382 A | 3/2017 |
| CN | 106537854 A | 3/2017 |
| EP | 3518581 A1 | 7/2019 |
| EP | 3562182 A1 | 10/2019 |
| WO | 2014185708 A1 | 11/2014 |
| WO | 2016180366 A1 | 11/2016 |
| WO | 2017014716 A1 | 1/2017 |
| WO | 2017074012 A1 | 5/2017 |

OTHER PUBLICATIONS

Ericsson, "ProSe UE to network Relay & Service continuity solution," SA WG2 Meeting #108 S2-150787, Apr. 13-17, 2015, San Jose Del Cabo, Mexico, pp. 1-10; (Year: 2015).*

R2-1703028 LG Electronics Inc.,"Path Switch Procedures for Service Continuity",3GPP TSG-RAN WG2 Meeting #97bis,Spokane, Washington, USA, Apr. 3, 2017,total 3 pages.

R3-171405 Huawei,"RAN3 TP for FeD2D ",3GPP TSG-RAN3 Meeting #95bis,Spokane, Washington, USA, Apr. 3, 2017,total 7 pages.

3GPP TS 22.278 V15.1.0 (Mar. 2017),3rd Generation Partnership Project;Technical Specification Group Services and System Aspects; Service requirements for the Evolved Packet System (EPS)(Release 15), Mar. 1, 2017, total 49 pages.

3GPP TR 36.746 V1.0.0 (Jun. 2017),3rd Generation Partnership Project;Technical Specification Group Radio Access Metwork;Study on further enhancements to LTE Device to Device (D2D),User Equipment (UE) to network relays for Internet of Things (IoT) and wearables;(Release 15),total 35 pages.

NEC, Real time video forwarding via D2D Relaying, 3GPP TSG-SA WG1 Meeting #71, S1-152243, Belgrade, Serbia, Aug. 17-21, 2015 , 2 pages.

* cited by examiner

PATH SWITCHING METHOD, APPARATUS AND SYSTEM

RELATED APPLICATIONS

This application is a national stage application of PCT/CN2017/097022, filed Aug. 11, 2017, the disclosure of which is incorporated herein by reference in their entirety.

TECHNICAL FIELD

This application relates to the field of communications technologies, and in particular, to a path switching method, apparatus and system.

BACKGROUND

In a mobile communications system, there can be, for example, the following two connection modes between a terminal and a network device (for example, a base station).

Connection mode 1: The terminal is directly connected to the network device for data communication. Such a mode may be referred to as a direct communication mode. In this communication mode, a communication link between the terminal and the network device may be referred to as a direct link.

Connection mode 2: The terminal is connected to the network device by using another terminal for data communication. Such a mode may be referred to as an indirect communication mode. In this case, the terminal may be referred to as, for example, a remote terminal, remote user equipment, or remote UE, and the other terminal may be referred to as, for example, a relay terminal, relay user equipment, or relay UE. In this communication mode, a communication link between the terminal and the network device may be referred to as an indirect link.

As shown in FIG. 1A and FIG. 1B, the remote terminal may switch between the foregoing two connection modes or communication links. For example, as shown in FIG. 1A, when quality of a link between a UE and a base station is relatively poor, the UE may select a nearby relay UE to connect to the base station. In this case, switching from the direct communication mode to the indirect communication mode is desirable. For another example, as shown in FIG. 1B, when a relay UE connected to a remote UE moves, a connection between the remote UE and the relay UE may no longer be maintained. In this case, switching from the indirect communication mode to the direct communication mode is desirable.

For switching from an indirect connection path to a direct connection path, a basic path switching procedure currently discussed in the 3GPP is as follows:

1. After a remote UE triggers switching from an indirect connection path to a direct connection path, the remote UE sends a radio resource control (RRC) message to a base station. The RRC message may be a path switching request message or a measurement report, and the RRC message is sent to the base station by using a relay UE.

2. After receiving the RRC message sent by the remote UE, the base station sends an RRC connection reconfiguration message to the remote UE by using the relay UE, where the RRC connection reconfiguration message is used to instruct the remote UE to switch from the indirect connection path to the direct connection path.

3. After completing the RRC connection reconfiguration, the remote UE sends an RRC connection reconfiguration complete message to the base station through the direct connection path.

However, the currently discussed path switching method is applicable to limited scenarios, and this is unconducive to expansion to more relay application scenarios.

SUMMARY

Embodiments of the present invention provide a path switching method, apparatus and system, so that a relay terminal can trigger link switching of a remote device, to adapt to a relay scenario in a more flexible manner.

According to a first aspect, a path switching method is provided, and applied to a first terminal side. The method includes: sending, by a first terminal, a first message to a first network device, where the first message may be used to request to switch a second terminal from an indirect connection path for communicating with the first network device by using the first terminal to a direct connection path for communicating with the first network device or a second network device, or the first message may be used to request to release a link between the first terminal and the second terminal; and releasing, by the first terminal, the link between the first terminal and the second terminal.

Specifically, the requesting to release a link between the first terminal and the second terminal may include the following two manners:

Manner 1: The first terminal sends the first message to the first network device, to request the first network device to release the link between the first terminal and the second terminal.

Manner 2: The first terminal sends the first message to the first network device, and after receiving a response message of the first network device, the first terminal releases the link between the first terminal and the second terminal.

Herein, the first network device is different from the second network device, the first terminal is a first terminal in relay communication, and the second terminal is a second terminal in the relay communication.

With reference to the first aspect, in some embodiments, the releasing, by the first terminal, the link may include the following several implementations.

Implementation 1: Release of the link between the first terminal and the second terminal is triggered by the first network device.

Specifically, after the first network device configures for link switching of the second terminal (that is, after the first network device sends a second message to the second terminal), the first network device sends a third message to the first terminal, to trigger the first terminal to release the short-distance link.

Implementation 2: Release of the short-distance link between the first terminal and the second terminal is triggered by the second terminal.

Specifically, after the second terminal receives link switching configuration information sent by the first network device (that is, after the second terminal receives a second message sent by the first network device), the second terminal sends a third message to the first terminal, to trigger the first terminal to release the short-distance link.

Implementation 3: After the first terminal requests to release the short-distance communication link (that is, after the first terminal sends the first message to the first network device), when a time for maintaining the short-distance link by the first terminal exceeds a first time length, the first terminal releases the short-distance link.

According to a second aspect, a path switching method is provided, and applied to a first network device side. The method includes: receiving, by a first network device, a first message sent by a first terminal, where the first message may be used to request to switch a second terminal from an indirect connection path for communicating with the first network device by using the first terminal to a direct connection path for communicating with the first network device or a second network device, or the first message may be used to request to release Specifically, the requesting to release a link between the first terminal and the second terminal may include the following two manners:

Manner 1: The first terminal sends the first message to the first network device, to request the first network device to release the link between the first terminal and the second terminal.

Manner 2: The first terminal sends the first message to the first network device, and after receiving a response message of the first network device, the first terminal releases the link between the first terminal and the second terminal.

a link between the first terminal and the second terminal, and the first network device is different from the second network device; and sending, by the first network device, a second message to the second terminal, where the second message may be used to configure the second terminal to switch from the indirect connection path to the direct connection path.

Specifically, the second message may include at least one of the following: a cell identity, random access configuration information, first instruction information, or a first time value. The first instruction information may be used to instruct the second terminal whether to perform, before disconnecting from the first terminal, downlink synchronization with a cell corresponding to the cell identity. The first time value may be a longest time allowed for the second terminal to access the cell corresponding to the cell identity.

According to a third aspect, a path switching method is provided, and applied to a second terminal side. The method includes: receiving, by a second terminal, a second message sent by a first network device; and switching from an indirect connection path to a direct connection path according to the second message.

Herein, the first network device is different from a second network device. The second message may be used to configure the second terminal to switch from an indirect connection path for communicating with the first network device by using a first terminal to a direct connection path for communicating with the first network device or the second network device.

Specifically, the second message may include at least one of the following: a cell identity, random access configuration information, first instruction information, or a first time value. The first instruction information may be used to instruct the second terminal whether to perform, before disconnecting from the first terminal, downlink synchronization with a cell corresponding to the cell identity. The first time value may be used to indicate a longest time allowed for the second terminal to access the cell corresponding to the cell identity.

According to the path switching methods described in the first aspect, the second aspect, and the third aspect, the first terminal requests the first network device to trigger path switching of the second terminal, and the first network device configures for the path switching. In this way, the first terminal can trigger a path switching process in an effective and timely manner.

According to a fourth aspect, a path switching method is provided, and applied to a first terminal side. The method includes: sending, by a first terminal, a fourth message to a second terminal, where the fourth message may be used to instruct the second terminal to switch from an indirect connection path for communicating with a first network device by using the first terminal to a direct connection path for communicating with the first network device or a second network device, or the fourth message may be used to instruct to release a link between the first terminal and the second terminal; and releasing, by the first terminal, the link between the first terminal and the second terminal.

Herein, the first network device is different from the second network device.

Specifically, the fourth message may include at least one of the following: a cell identity of a serving cell of the first terminal, or common radio resource configuration information of a serving cell of the first terminal.

With reference to the fourth aspect, in some embodiments, the releasing, by the first terminal, the link may include the following several implementations.

Implementation 1: Release of the short-distance link between the first terminal and the second terminal is triggered by the first network device.

Specifically, after the first network device configures for link switching of the second terminal (that is, after the first network device sends a sixth message to the second terminal), the first network device sends a seventh message to the first terminal, to trigger the first terminal to release the short-distance link.

Implementation 2: Release of the short-distance link between the first terminal and the second terminal is triggered by the second terminal.

Specifically, after the second terminal receives link switching configuration information sent by the first network device (that is, after the second terminal receives a sixth message sent by the first network device), the second terminal sends a seventh message to the first terminal, to trigger the first terminal to release the short-distance link.

Implementation 3: After the first terminal instructs to release the short-distance communication link (that is, after the first terminal sends the fourth message to the second terminal), when a time for maintaining the short-distance link by the first terminal exceeds a specified time threshold, the first terminal releases the short-distance link. The specified time threshold may be selected by the first terminal according to an actual requirement. This is not limited herein.

In addition, optionally, the first terminal may directly release the short-distance link after instructing to release the short-distance link, without requiring a trigger condition.

According to a fifth aspect, a path switching method is provided, and applied to a second terminal side. The method includes: receiving, by a second terminal, a fourth message sent by a first terminal; and switching from an indirect connection path to a direct connection path according to the fourth message.

Herein, the fourth message may be used to instruct the second terminal to switch from an indirect connection path for communicating with a first network device by using the first terminal to a direct connection path for communicating with the first network device or a second network device. Alternatively, the fourth message may be used to instruct to release a link between the first terminal and the second terminal. The first network device is different from the second network device.

Specifically, the fourth message may include at least one of the following: a cell identity of a serving cell of the first terminal, or common radio resource configuration information of a serving cell of the first terminal.

With reference to the fifth aspect, in some embodiments, the second terminal may alternatively send a fifth message to the first network device, to request to switch from the indirect connection path to the direct connection path. Then, the second terminal may receive a sixth message sent by the first network device. The sixth message may include at least one of the following: a cell identity, random access configuration information, first instruction information, or a first time value, and is used to configure the second terminal to switch from the indirect connection path to the direct connection path. The first instruction information is used to instruct the second terminal whether to perform, before disconnecting from the first terminal, downlink synchronization with a cell corresponding to the cell identity. The first time value is a longest time allowed for the second terminal to access the cell corresponding to the cell identity.

With reference to the fifth aspect, in some embodiments, the second terminal may alternatively trigger a radio resource control connection reestablishment process after receiving the fourth message.

With reference to the fifth aspect, in some embodiments, the second terminal may alternatively access the serving cell of the first terminal, and send a terminal device identifier to the first network device. The terminal device identifier may be a C-RNTI of the second terminal, or a C-RNTI of the first terminal and a local identifier of the second terminal. Optionally, the terminal device identifier may be carried in the fourth message. Optionally, the terminal device identifier is sent to the second terminal by the first terminal before the first terminal sends the fourth message.

According to the path switching methods described in the first aspect, the second aspect, and the third aspect, the first terminal can directly instruct the second terminal to perform path switching, and the first network device can configure for the path switching. In this way, the first terminal can rapidly trigger a path switching process.

According to a sixth aspect, this application provides a terminal. The terminal is the first terminal in the first aspect, and may include a plurality of function modules, configured to correspondingly perform the method provided in any one of the first aspect or the possible implementations of the first aspect.

According to a seventh aspect, this application provides a network device. The network device is the first network device in the second aspect, and may include a plurality of function modules, configured to correspondingly perform the method provided in any one of the second aspect or the possible implementations of the second aspect.

According to an eighth aspect, this application provides a terminal. The terminal is the second terminal in the third aspect, and may include a plurality of function modules, configured to correspondingly perform the method provided in any one of the third aspect or the possible implementations of the third aspect.

According to a ninth aspect, this application provides a terminal. The terminal is the first terminal in the fourth aspect, and may include a plurality of function modules, configured to correspondingly perform the method provided in any one of the fourth aspect or the possible implementations of the fourth aspect.

According to a tenth aspect, this application provides a terminal. The terminal is the second terminal in the tenth aspect, and may include a plurality of function modules, configured to correspondingly perform the method provided in any one of the tenth aspect or the possible implementations of the tenth aspect.

According to an eleventh aspect, this application provides a terminal, configured to perform the path switching method described in the first aspect. The terminal may include a memory, and a processor and a transceiver that are coupled to the memory. The transceiver is configured to communicate with another communications device (for example, a network device). The memory is configured to store code for implementing the path switching method described in the first aspect. The processor is configured to execute program code stored in the memory, that is, perform the method provided in any one of the first aspect or the possible implementations of the first aspect.

According to a twelfth aspect, this application provides a network device, configured to perform the path switching method described in the second aspect. The network device may include a memory, and a processor and a transceiver that are coupled to the memory. The transceiver is configured to communicate with another communications device (for example, a terminal). The memory is configured to store code for implementing the resource allocation method described in the second aspect. The processor is configured to execute program code stored in the memory, that is, perform the method provided in any one of the second aspect or the possible implementations of the second aspect.

According to a thirteenth aspect, this application provides a terminal, configured to perform the path switching method described in the third aspect. The terminal may include a memory, and a processor and a transceiver that are coupled to the memory. The transceiver is configured to communicate with another communications device (for example, a network device). The memory is configured to store code for implementing the path switching method described in the third aspect. The processor is configured to execute program code stored in the memory, that is, perform the method provided in any one of the third aspect or the possible implementations of the third aspect.

According to a fourteenth aspect, this application provides a terminal, configured to perform the path switching method described in the fourth aspect. The terminal may include a memory, and a processor and a transceiver that are coupled to the memory. The transceiver is configured to communicate with another communications device (for example, a network device). The memory is configured to store code for implementing the path switching method described in the fourth aspect. The processor is configured to execute program code stored in the memory, that is, perform the method provided in any one of the fourth aspect or the possible implementations of the fourth aspect.

According to a fifteenth aspect, this application provides a terminal, configured to perform the path switching method described in the fifth aspect. The terminal may include a memory, and a processor and a transceiver that are coupled to the memory. The transceiver is configured to communicate with another communications device (for example, a network device). The memory is configured to store code for implementing the path switching method described in the fifth aspect. The processor is configured to execute program code stored in the memory, that is, perform the method provided in any one of the fifth aspect or the possible implementations of the fifth aspect.

According to a sixteenth aspect, this application provides a wireless communications system, including a first terminal, a second terminal, and a network device. The first terminal may be the terminal described in the sixth aspect, the second terminal may be the terminal described in the eighth aspect, and the network device may be the network device described in the seventh aspect.

Optionally, the first terminal may be the terminal described in the eleventh aspect, the second terminal may be the terminal described in the thirteenth aspect, and the network device may be the network device described in the twelfth aspect.

Optionally, the first terminal may be the terminal described in the ninth aspect, and the second terminal may be the terminal described in the tenth aspect.

Optionally, the first terminal may be the terminal described in the fourteenth aspect, and the second terminal may be the terminal described in the fifteenth aspect.

According to a seventeenth aspect, a computer-readable storage medium is provided. The readable storage medium stores program code for implementing the resource allocation method provided in any one of the first aspect or the possible implementations of the first aspect. The program code includes an execution instruction for performing the resource allocation method provided in any one of the first aspect or the possible implementations of the first aspect.

According to an eighteenth aspect, a computer-readable storage medium is provided. The readable storage medium stores program code for implementing the resource allocation method provided in any one of the second aspect or the possible implementations of the second aspect. The program code includes an execution instruction for performing the resource allocation method provided in any one of the second aspect or the possible implementations of the second aspect.

According to a nineteenth aspect, a computer-readable storage medium is provided. The readable storage medium stores program code for implementing the resource allocation method provided in any one of the third aspect or the possible implementations of the third aspect. The program code includes an execution instruction for performing the resource allocation method provided in any one of the third aspect or the possible implementations of the third aspect.

According to a twentieth aspect, a computer-readable storage medium is provided. The readable storage medium stores program code for implementing the resource allocation method provided in any one of the fourth aspect or the possible implementations of the fourth aspect. The program code includes an execution instruction for performing the resource allocation method provided in any one of the fourth aspect or the possible implementations of the fourth aspect.

According to a twenty-first aspect, a computer-readable storage medium is provided. The readable storage medium stores program code for implementing the resource allocation method provided in any one of the fifth aspect or the possible implementations of the fifth aspect. The program code includes an execution instruction for performing the resource allocation method provided in any one of the fifth aspect or the possible implementations of the fifth aspect.

DESCRIPTION OF EMBODIMENTS

Terms used in the implementation part of the present invention are merely intended to explain specific embodiments of the present invention, but are not intended to limit the present invention.

Figure 2:
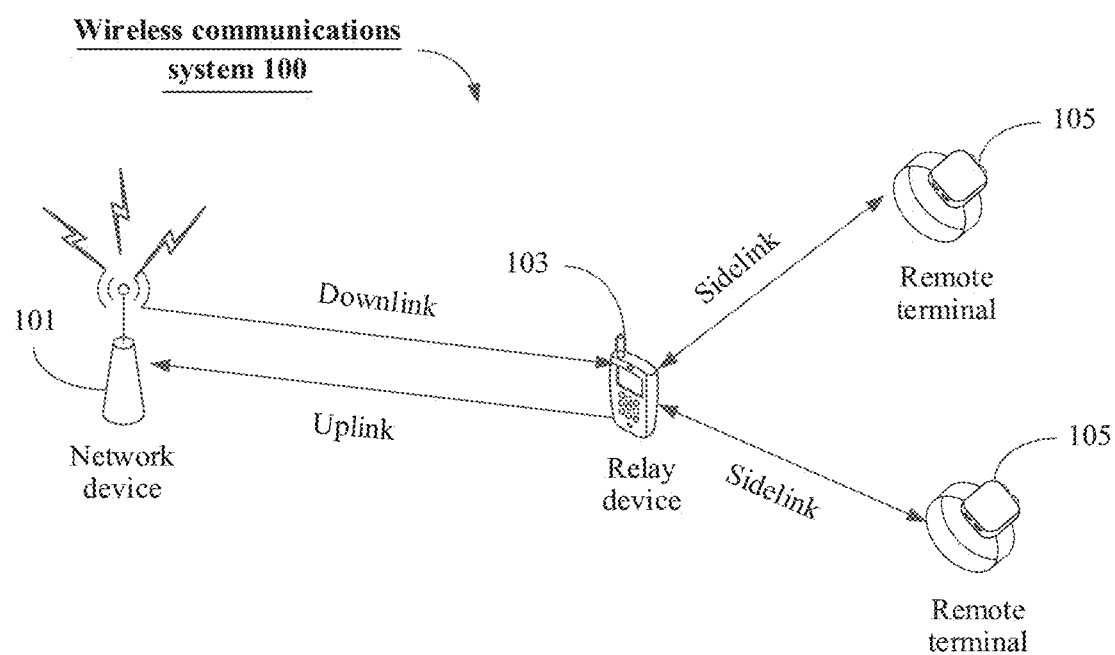
FIG. 2 is a schematic architectural diagram of a wireless communications system according to an embodiment.

FIG. 2 shows a wireless communications system according to an embodiment. The wireless communications system may be a long term evolution (LTE) system, a future evolved 5th generation (5G) mobile communications system, a future evolved new radio (NR) system, a machine-to-machine (M2M) communications system, or the like. As shown in FIG. 2, the wireless communications system 100 may include a network device 101, a remote terminal 105, and a relay device 103. One relay device 103 may be connected to one or more remote terminals 105.

The network device 101 may be a base station. The base station may be configured to communicate with one or more terminals, or may be configured to communicate with one or more base stations that have some terminal functions (for example, communication between a macro base station and a micro base station such as an access point). The base station may be a base transceiver station Base Transceiver Station (BTS) in a time division synchronous code division multiple access (TD-SCDMA) system, an evolutional NodeB (eNB) in an LTE system, or a base station gNB in a 5G system or in a new radio (NR) system. Alternatively, the base station may be an access point Access Point, (AP), a transmission node (Trans TRP), a central unit (CU), or another network entity, and may include some or all functions of the foregoing network entities.

The remote terminal 105 may be distributed across the entire wireless communications system 100, and may be static or mobile. In some embodiments of this application, the remote terminal 105 may be an intelligent wearable device, a mobile device, a mobile station, a mobile unit, an M2M terminal, a radio unit, a remote unit, a user agent, a mobile client, or the like.

The relay device 103 (also referred to as a "relay node") may include two physical layer entities. One entity is configured to communicate with a subordinate user of the relay device 103 (that is, the remote terminal 105 that is connected to the relay device 103). The other entity has a user function (that is, a terminal function), and is configured to communicate with the network device 101. In a specific implementation, the relay device 103 may be a relay terminal. The relay device 103 may alternatively be a communications entity such as a relay transmission/reception point (TRP), customer premise equipment (CPE), a relay transceiver, or a relay agent.

In the wireless communications system 100, a "sidelink" is a short-distance link between the relay device 103 and the remote terminal 105, and includes an uplink (UL) sidelink or a downlink (DL) sidelink. A "backhaul link" is a radio link between the network device 101 and the relay device 103, and includes an uplink (UL) backhaul link or a downlink (DL) backhaul link. In addition to a sidelink technology, a link between the relay device 103 and the remote terminal 105 may alternatively be a short-distance link in another form, for example, a WLAN link or a Bluetooth link.

In the wireless communications system 100, the relay device 103 between the network device 101 and the remote terminal 105 may be configured to forward a radio signal between the network device 101 and the remote terminal 105. Specifically, during downlink transmission, the relay device 103 is responsible for forwarding a radio signal transmitted by the network device 101, to finally transmit the radio signal to the remote terminal 105. During uplink transmission, the relay device 103 is responsible for forwarding a radio signal transmitted by the remote terminal 105, to finally transmit the radio signal to the network device 101.

In some possible scenarios, the relay device 103 needs to actively trigger the remote terminal 105 to perform path switching, that is, switch the remote terminal 105 from an indirect connection path for communicating with the network device 101 by using the relay device 103 to a direct connection path for communicating with the network device 101. For example, when the relay device 103 needs to initiate a call in a circuit switched (CS) domain, the relay device 103 needs to perform a circuit switched fallback (CSFB) to access a 2G or 3G network. After accessing the 2G or 3G network, the relay device 103 becomes unable to continue to provide a relay service for the remote terminal 105. For another example, when the relay device 103 has insufficient power supply, the relay device 103 may, again, become unable to provide a relay service for the remote terminal 105. There are also other scenarios in which the relay device 103 needs to actively trigger the remote terminal 105 to perform the path switching.

It should be noted that the wireless communications system 100 shown in FIG. 2 is merely intended to more clearly describe technical solutions in this application but is not intended to limit this application. A person of ordinary skill in the art may know that as a network architecture evolves and a new service scenario emerges, the technical solutions provided in this application are further applicable to a similar technical problems.

Figure 3:
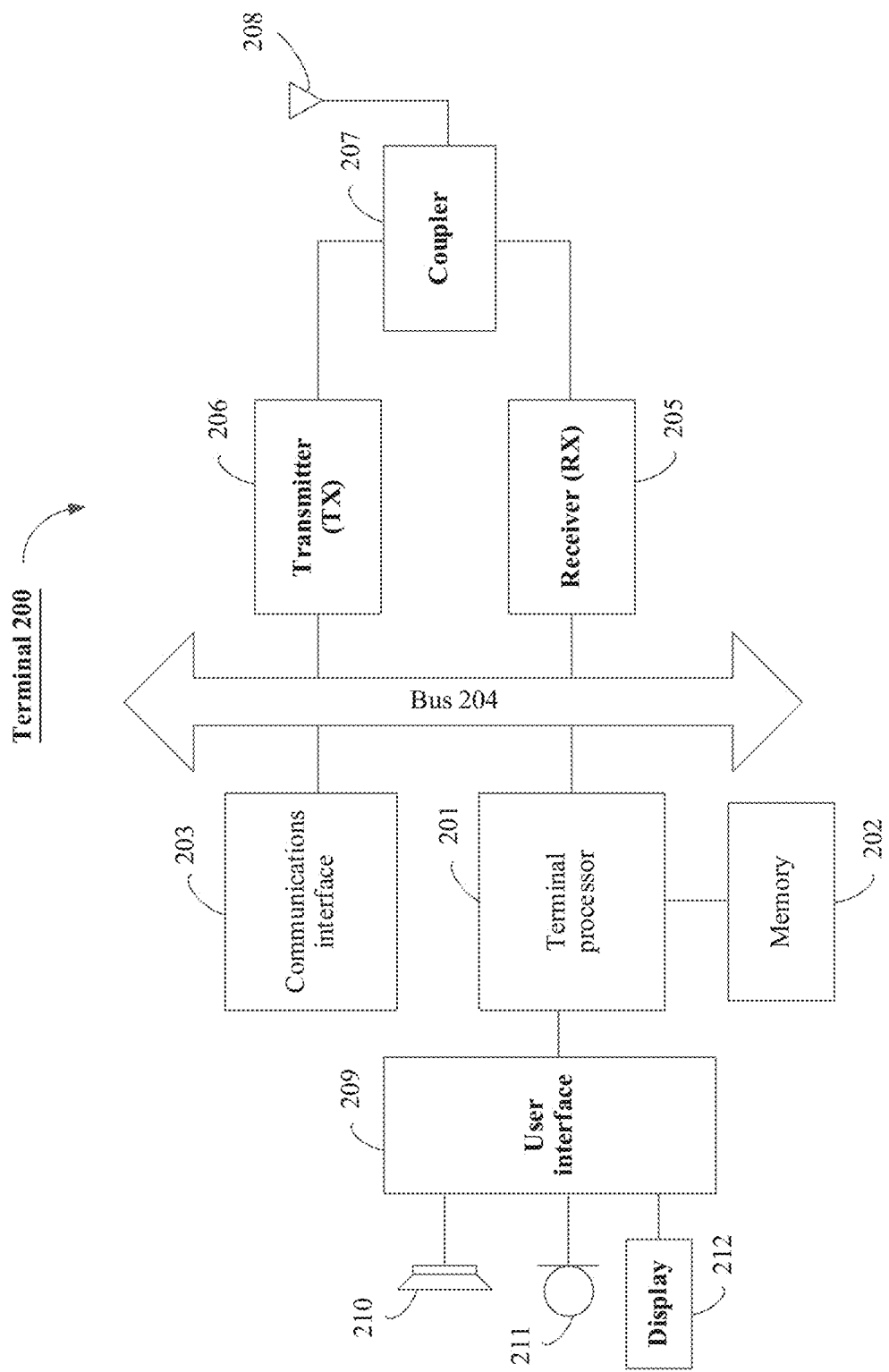
FIG. 3 is a schematic structural diagram of a terminal according to an embodiment.

FIG. 3 shows a terminal 200 according to some embodiments of this application. The terminal 200 may be implemented as a remote terminal (for example, the remote terminal 105 in FIG. 2) in this application, or a relay device (for example, the relay device 103 in FIG. 2) in this application. As shown in FIG. 3, the terminal 200 may include: one or more terminal processors 201, a memory 202, a communications interface 203, a receiver 205, a transmitter 206, a coupler 207, an antenna 208, a user interface 202, and an input/output module (including an audio input/output module 210, a key input module 211, a display 212, and the like). These components may be connected for communication by using a bus 204 or in another manner. In FIG. 3, for example, the components are connected by using the bus 204.

The communications interface 203 may be configured for communication between the terminal 200 and another communications device, for example, another terminal or a network device. Specifically, the communications interface 203 may be a long term evolution (LTE) (4G) communications interface, or a 5G or future new radio communications interface. Not limited to a wireless communications interface, the terminal 200 may be further provided with a wired communications interface 203, for example, a local access network (Local Access Network, LAN) interface.

The transmitter 206 may be configured to perform transmission processing, for example, signal modulation, on a signal output by the terminal processor 201. The receiver 205 may be configured to perform reception processing, for example, signal demodulation, on a mobile communication signal received by the antenna 208. In some embodiments of this application, the transmitter 206 and the receiver 205 may be considered as a wireless modem. The terminal 200 may have one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide the mobile communication signal received by the antenna 208 into a plurality of signals and distribute the plurality of signals to a plurality of receivers 205.

When the terminal 200 is implemented as a relay device, the terminal 200 may be provided with two transceiver apparatuses. One transceiver apparatus is configured to allow a remote terminal (for example, the remote terminal 105 in FIG. 2) to be connected to a link of the terminal 200, and the other transceiver apparatus is configured to allow the terminal 200 to be connected to a link of a network device (for example, the network device 101 in FIG. 2). Specifically, the two transceiver apparatuses may have the same transmit/receive characteristic or different transmit/receive characteristics. For example, antenna ports respectively corresponding to the two transceiver apparatuses can have a quasi co-location (QCL) characteristic.

In addition to the transmitter 206 and the receiver 205 shown in FIG. 3, the terminal 200 may further include another communications component, for example, a GPS module, a Bluetooth module, a wireless fidelity (Wi-Fi) module, and the like. Not limited to the foregoing described wireless communication signal, the terminal 200 may further support another wireless communication signal, for example, a satellite signal or a short-wave signal. Not limited to wireless communication, the terminal 200 may be further provided with a wired network interface (for example, a LAN interface) to support wired communication.

The input/output module may be configured to implement interaction between the terminal 200 and a user or an external environment. The input/output module may mainly include: the audio input/output module 210, the key input module 211, the display 212, and the like. Specifically, the input/output module may further include: a camera, a touchscreen, a sensor, and the like. Each input/output module communicates with the terminal processor 201 through the user interface 209.

The memory 202 is coupled to the terminal processor 201, and is configured to store various software programs and/or a plurality of sets of instructions. Specifically, the memory 202 may include a high-speed random access memory, and may further include a non-volatile memory, for example, one or more disk storage devices, a flash device, or another non-volatile solid-state storage device. The memory 202 may store an operating system (referred to as an "OS" herein), for example, an embedded operating system such as ANDROID, iOS, WINDOWS, or LINUX. The memory 202 may further store a network communications program. The network communications program may be used for communicating with one or more additional devices, one or more terminal devices, or one or more network devices. The memory 202 may further store a user interface program. The user interface program may vividly display content of an application program by using a graphical user interface, and receive, by using an input control such as a menu, a dialog box, and a key, a control operation performed by a user on the application program.

In some embodiments of this application, the memory 202 may be configured to store a program for implementing, on a terminal 200 side, the path switching method according to one or more embodiments of this application. For implementation of the path switching method according to the one or more embodiments of this application, refer to subsequent embodiments.

The terminal processor 201 may be configured to read and execute computer-readable instructions. Specifically, the terminal processor 201 may be configured to: invoke a program stored in the memory 212, for example, the program for implementing, on the terminal 200 side, the resource allocation method according to the one or more embodiments of this application; and execute instructions included in the program.

Figure 5:
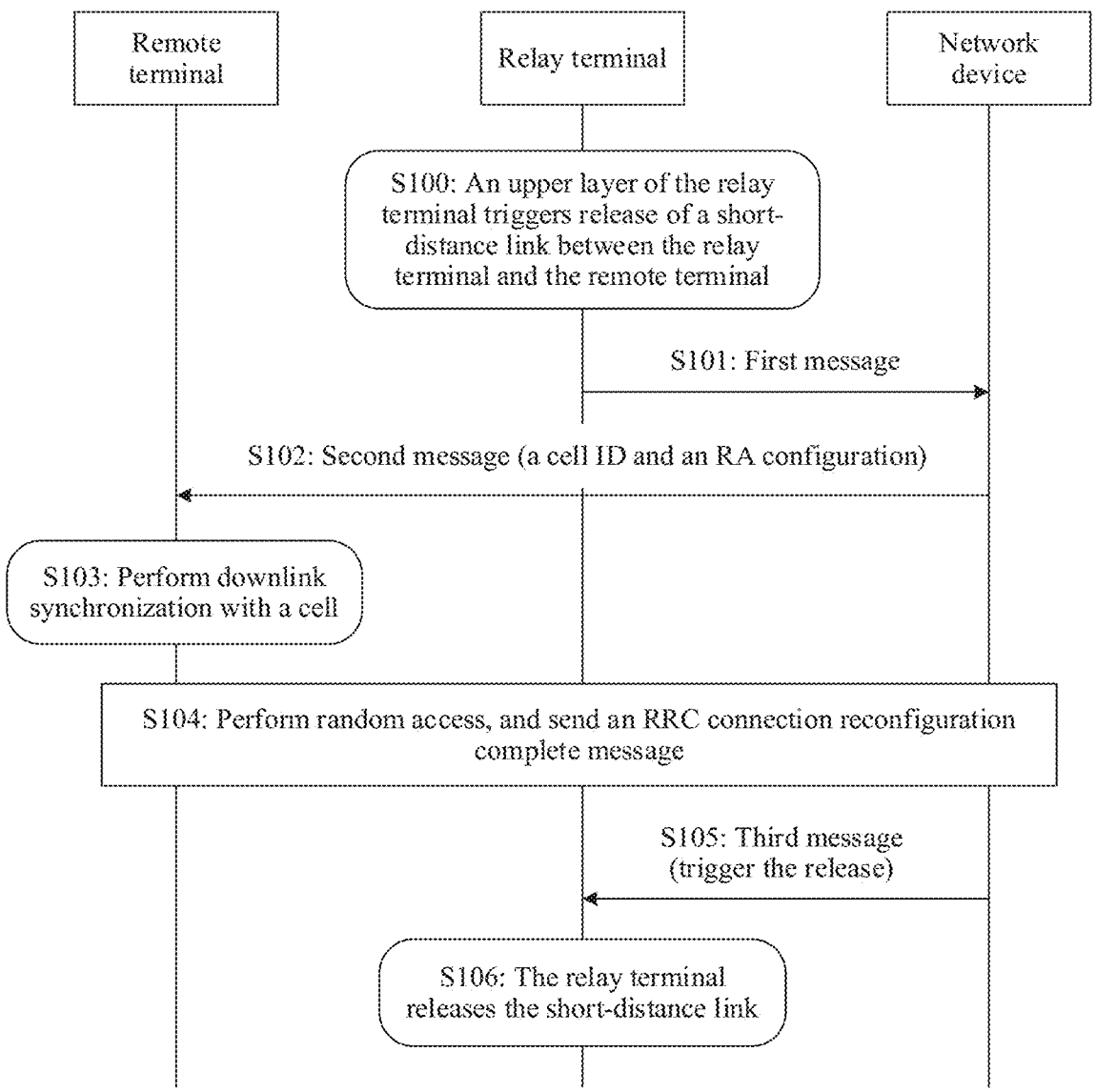
FIG. 5 is a schematic flowchart of a path switching method according to an embodiment.

It can be understood that the terminal 200 may be the terminal 103 in the wireless communications system 100 shown in FIG. 5, and may be implemented as a mobile device, a mobile station, a mobile unit, a radio unit, a remote unit, a user agent, a mobile client, or the like.

It should be noted that the terminal 200 shown in FIG. 3 is merely an example of an implementation of the embodiments of this application. In actual application, the terminal 200 may include more or fewer components, and this is not limited herein.

Figure 4:
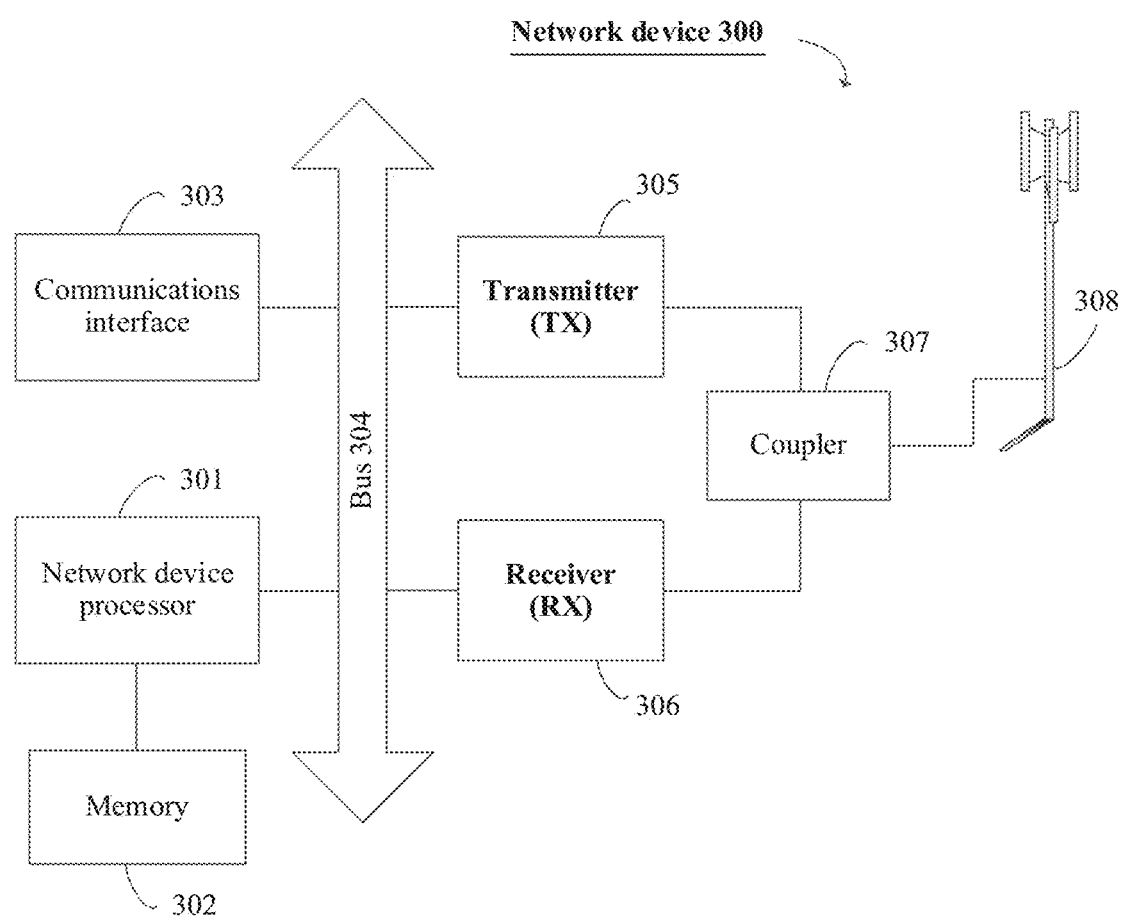
FIG. 4 is a schematic structural diagram of a network device according to and embodiment.

FIG. 4 shows a network device 300 according to some embodiments of this application. As shown in FIG. 4, the network device 300 may include: one or more network device processors 301, a memory 302, a communications interface 303, a transmitter 305, a receiver 306, a coupler 307, and an antenna 308. These components may be connected by using a bus 304 or in another manner. In FIG. 4, for example, the components are connected by using the bus.

The communications interface 303 may be configured for communication between the network device 300 and another communications device, for example, a terminal device or another network device. Specifically, the communications interface 303 may be an LTE 4G communications interface, or a 5G or future new radio communications interface. Not limited to a wireless communications interface, the network device 300 may be further provided with a wired communications interface 303 to support wired communication. For example, a backhaul connection between the network device 300 and another network device 300 may be a wired communication connection.

The transmitter 305 may be configured to perform transmission processing, for example, signal modulation, on a signal output by the network device processor 301. The receiver 306 may be configured to perform reception processing, for example, signal demodulation, on a mobile communication signal received by the antenna 308. In some embodiments of this application, the transmitter 305 and the receiver 306 may be considered as a wireless modem. The network device 300 may have one or more transmitters 305 and one or more receivers 306. The antenna 308 may be configured to convert electromagnetic energy in a transmission line into an electromagnetic wave in free space or convert an electromagnetic wave in free space into electromagnetic energy in a transmission line. The coupler 307 may be configured to divide the mobile communication signal into a plurality of signals and distribute the plurality of signals to a plurality of receivers 306.

The memory 302 is coupled to the network device processor 301 and is configured to store various software programs and/or a plurality of sets of instructions. Specifically, the memory 302 may include a high-speed random access memory, and may further include a non-volatile memory, for example, one or more disk storage devices, a flash device, or another non-volatile solid-state storage device. The memory 302 may store an OS, for example, an embedded operating system such as uCOS, VxWorks, or RTLinux. The memory 302 may further store a network communications program. The network communications program may be used for communicating with one or more additional devices, one or more terminal devices, or one or more network devices.

The network device processor 301 may be configured to, for example, manage a radio channel, establish and disconnect a call and a communication link, and provide cell handover control for a user within a local control area. Specifically, the network device processor 301 may include: an administration module/communication module (AM/CM) (a center for speech channel switching and information exchange), a basic module (BM) (configured to implement call processing, signaling processing, radio resource management, radio link management, and circuit maintenance functions), a transcoder and sub-multiplexer (TCSM) (configured to implement multiplexing/demultiplexing and transcoding functions), and the like.

In the embodiments of this application, the network device processor 301 may be configured to read and execute a computer-readable instruction. Specifically, the network device processor 301 may be configured to: invoke a program stored in the memory 302, for example, a program for implementing, on the network device 300 side, the path switching method according to one or more embodiments of this application; and execute an instructions included in the program.

The network device 300 may be a base station 101 in the wireless communications system 100 shown in FIG. 5, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 4 is merely an example of an implementation of the embodiments of this application. In actual application, the network device 300 may include more or fewer components, and this is not limited herein.

Based on the wireless communications system 100, the terminal 200, and the network device 300 described in the foregoing embodiments, this application provides a path switching method.

In relay communication, when a relay device becomes unable to provide a relay service for a remote terminal, the relay device may trigger switching of the remote terminal from an indirect connection path for communicating with a network device by using the relay device to a direct connection path for directly communicating with the network device, and release a short-distance link between the relay terminal and the remote terminal. In this way, the relay device can quickly trigger path switching of the remote terminal based on a status of the relay device in a timely manner, and can implement the path switching without interrupting data communication over a sidelink, thereby ensuring that data communication between the remote terminal and the network device is not substantially interrupted.

The cause of the relay device becoming unable to provide a relay service for a remote terminal may include, but is not limited, to scenarios described in the following examples. For example, when the relay device 103 needs to initiate a call in a circuit switched (CS) domain, the relay device 103 needs to perform a circuit switched fallback (CSFB) to access a 2G or 3G network. After accessing the 2G or 3G network, the relay device 103 becomes unable to continue to provide the relay service for the remote terminal 105. As another example, when the relay device 103 has insufficient power from a power supply, the relay device 103 may, again, become unable to provide the relay service for the remote terminal 105.

Disclosed embodiments provide two solutions regarding how a relay device (referred to as Relay hereinafter) triggers path switching of a remote terminal (referred to as Remote hereinafter).

Solution 1: The Relay requests a network device to trigger the Remote to perform the path switching, and the network device configures for the path switching.

Solution 2: The Relay directly instructs the Remote to perform the path switching.

In Solution 1, the Relay may release a short-distance link after the Remote switches to a direct connection path, so that service continuity can be ensured when the Remote switches from an indirect connection path to the direct connection path. In Solution 2, the Relay directly instructs the Remote to perform the path switching, so that a time required by the Relay to release a short-distance link can be reduced. The foregoing two solutions are subsequently described by using embodiments, and details are not described herein.

In this application, the Relay may be referred to as a first terminal, and the Remote may be referred to as a second terminal. The Relay may alternatively be a relay micro base station, a relay transceiver, or the like.

First, Solution 1 provided in this application is described in detail with reference to embodiments in FIG. 5 to FIG. 7.

FIG. 5 is a schematic flowchart of a path switching method according to an embodiment. Details are provided in the following.

S100: An upper layer of a relay terminal triggers release of a short-distance link between the relay terminal and a remote terminal. In addition to a sidelink technology, a link between the relay device and the remote terminal may alternatively be a short-distance link in another form, for example, any one of links such as a WLAN link or a Bluetooth link.

S101: The relay terminal sends a first message to a network device, where the first message may be used to request the network device to switch the remote terminal from an indirect connection path to a direct connection path, or request to release a short-distance link connection between the relay terminal and the remote terminal.

Specifically, the requesting to release a link between the first terminal and the second terminal may include the following two manners:

Manner 1: The first terminal sends the first message to a first network device, to request the first network device to release the link between the first terminal and the second terminal.

Manner 2: The first terminal sends the first message to the first network device, and after receiving a response message of the first network device, the first terminal releases the link between the first terminal and the second terminal.

Specifically, the first message may be an RRC message. Optionally, the first message may include a reason for releasing the short-distance link by the relay terminal. For example, the relay terminal needs to perform a circuit switched fallback (CSFB), or the relay terminal has insufficient power. The examples are merely some embodiments provided in this application, and in actual application, there can be other reasons for releasing the short-distance link by the relay terminal.

S102: The network device sends a second message to the remote terminal that is connected to the relay terminal, where the second message may be used to configure the remote terminal to switch from the indirect connection path to the direct connection path.

Specifically, the second message may be an RRC connection reconfiguration (RRC connection reconfiguration) message. The second message includes at least one of the following: a cell identity, random access configuration information, first instruction information, or a first time value.

The cell identity may be an identity of a cell accessed by the remote terminal after the remote terminal switches to the direct connection path. The cell identity may be a physical cell identity (PCI) of the cell, a cell identity (cell identity) that can uniquely identify the cell in a public land mobile network (PLMN), or a cell global identity (CGI) of the cell.

The random access (RA) configuration information may be resource configuration information for the remote terminal to initiate random access to the cell, and may include a random access preamble configuration and a physical random access channel configuration.

The first instruction information may be used to instruct the remote terminal whether to perform, before disconnecting from the relay terminal, downlink synchronization with the cell corresponding to the cell identity.

The first time value may be a longest time allowed for the remote terminal to access the cell corresponding to the cell identity. If the time is exceeded, it may be considered that the remote terminal fails to access the cell.

S103: After receiving the second message, the remote terminal may switch from the indirect connection path to the direct connection path. In addition, the remote terminal may alternatively start a first timer, where a time length of the first timer is equal to the first time value in the second message, and is used to limit the longest time allowed for the remote terminal to access the cell corresponding to the cell identity. If the remote terminal has not accessed the cell when the first timer expires, it may be considered that cell access has failed. In this case, the remote terminal needs to trigger a radio resource control connection reestablishment process.

In this embodiment, the remote terminal may switch from the indirect connection path to the direct connection path in the following three manners:

Manner 1: Regardless of whether the second message includes the first instruction information, when performing the downlink synchronization with the cell corresponding to the cell identity, the remote terminal may continue to maintain a connection to the relay terminal, that is, continue to use the relay terminal to perform data communication with the network device. After completing the downlink synchronization with the cell corresponding to the cell identity, the remote terminal may disconnect from the relay terminal, terminate the data communication with the network device by using the relay terminal, and switch to the direct connection path to send/receive data to/from the network device.

Manner 2: Regardless of whether the second message includes the first instruction information, after receiving the second message, the remote terminal may directly disconnect from the relay terminal and terminate data communication with the network device by using the relay terminal. Then, the remote terminal may start the downlink synchronization with the cell corresponding to the cell identity, and start a random access process.

Manner 3: If the first message includes the first instruction information, and the first instruction information instructs the remote terminal to perform, before disconnecting from the relay terminal, the downlink synchronization with the cell corresponding to the cell identity, the remote terminal may perform path switching in Manner 1. If the second message includes the first instruction information, but the first instruction information does not instruct the remote terminal to perform, before disconnecting from the relay terminal, the downlink synchronization with the cell corresponding to the cell identity, the remote terminal may perform the path switching in Manner 2.

It can be understood that Manner 1 can ensure service continuity when the remote terminal switches from the indirect connection path to the direct connection path.

In a possible special case, before the remote terminal receives the second message, the relay terminal is disconnected from the link between the relay terminal and the remote terminal. In this case, when the remote does not detect a discovery message sent by the relay terminal, the remote terminal determines that a failure has occurred over the link between the remote terminal and the relay terminal, and the remote terminal triggers the radio resource control connection reestablishment process.

S104: The remote terminal may access the cell corresponding to the cell identity by using the random access process and send an RRC connection reconfiguration complete message to the network device after the accessing succeeds.

S105: The network device may send a third message to the relay terminal, where the third message may be used to instruct the relay terminal to release the short-distance link. Specifically, the third message may be specifically implemented as follows:

Implementation 1: The third message may be a newly defined RRC message.

Implementation 2: The third message may be an RRC connection reconfiguration message. The RRC connection reconfiguration message may include instruction information, and the instruction information may be used to instruct the relay terminal to release the short-distance link.

Implementation 3: The third message may be an RRC connection reconfiguration message. The third message may be used to configure the relay terminal to release all sidelink bearers, so that the relay terminal is implicitly configured to release the short-distance link.

Specifically, in the following two scenarios, the network device may trigger the relay terminal to release the short-distance link, that is, send the third message to the relay terminal.

Trigger scenario 1: The network device determines that each remote terminal served by the relay terminal successfully receives the second message.

Herein, determining a condition that the remote terminal successfully receives the second message may include any one of the following several manners:

(1) The network device receives an HARQ ACK or an RLC ACK that is sent by the remote terminal and that is specific to the second message.

(2) The network device receives a random access preamble (preamble) sent by the remote terminal.

(3) The network device receives an RRC connection reconfiguration complete message sent by the remote terminal.

Trigger scenario 2: The network device determines that the remote terminal has failed to access the cell.

Herein, a judgment condition for determining that the remote terminal has failed to access the cell may include the following: Within a time limited by the first time value in the second message, the network device receives no RRC connection reconfiguration complete message sent by the remote terminal.

S106: After receiving the third message sent by the network device, the relay terminal may release the short-distance link.

Herein, a specific implementation of releasing the short-distance link may include the following several aspects:

(1) releasing, by the relay terminal, sidelink bearers between the relay terminal and all remote terminals, including releasing radio link control (radio link control, RLC) protocol entities and logical channels of all the sidelink bearers;

(2) releasing a sidelink-related configuration at a media access control (media access control, MAC) layer;

(3) releasing a sidelink-related configuration at a physical layer (physical layer, PHY): and (4) releasing a resource pool and a resource configuration of all sidelinks.

It can be understood that, in the embodiment in FIG. 5, the relay terminal requests (by using the first message) the network device to trigger the path switching of the remote terminal, and the network device configures (for example, the cell identity and the random access configuration in the second message) for the path switching of the remote terminal. In the embodiment in FIG. 5, the release of the short-distance link between the relay terminal and the remote terminal is triggered by the network device (by using the third message).

Figure 6:
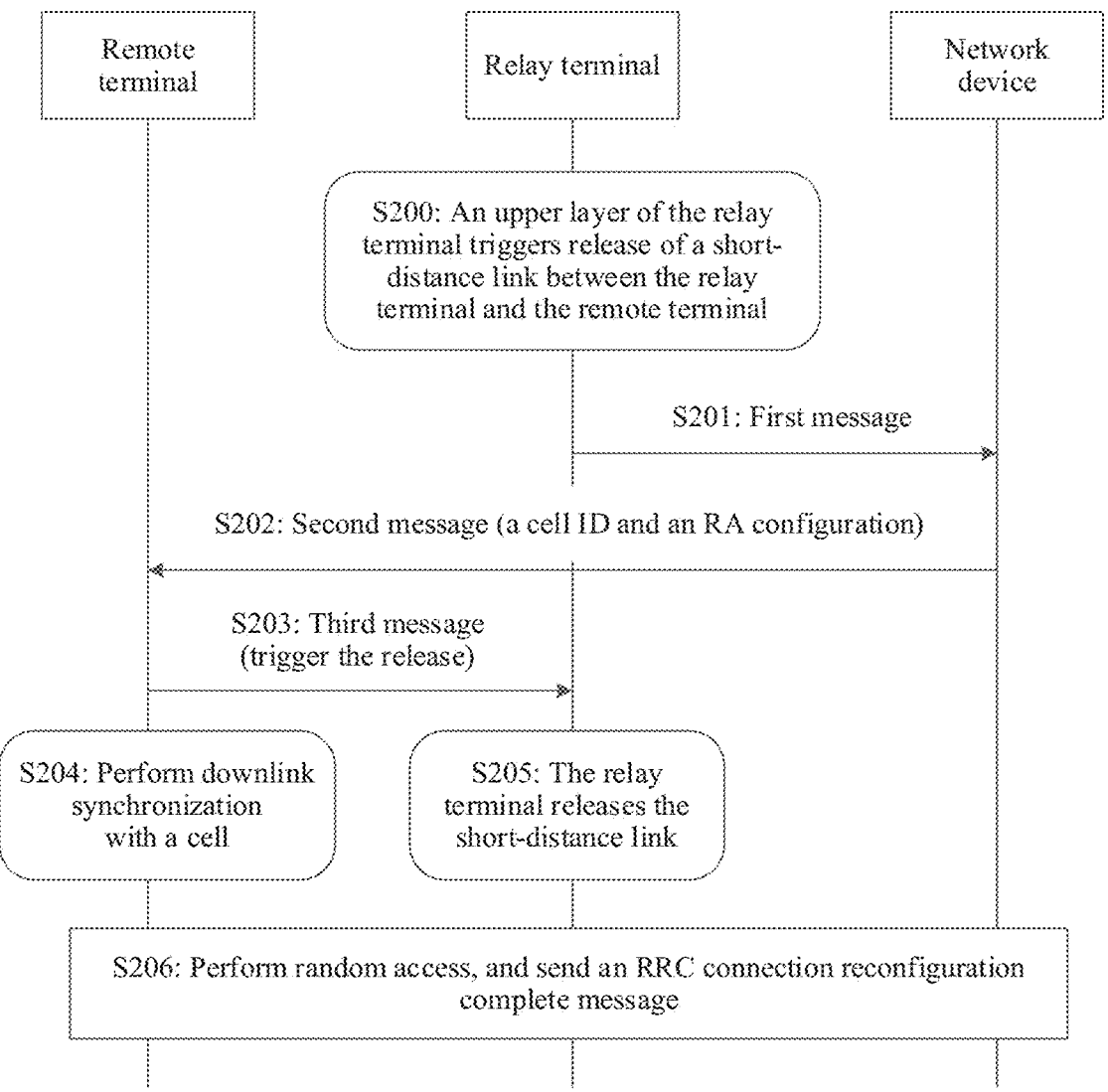
FIG. 6 is a schematic flowchart of another path switching method according to an embodiment.

FIG. 6 is a schematic flowchart of another path switching method according to this application. Details are provided in the following.

S200: An upper layer of a relay terminal triggers release of a short-distance link between the relay terminal and a remote terminal. In addition to a sidelink technology, a link between the relay device and the remote terminal may alternatively be a short-distance link in another form, for example, any one of links such as a WLAN link or a Bluetooth link.

S201: The relay terminal sends a first message to a network device, where the first message may be used to request the network device to switch the remote terminal from an indirect connection path to a direct connection path, or request to release a short-distance link connection between the relay terminal and the remote terminal.

Specifically, the requesting to release a link between the first terminal and the second terminal may include the following two manners:

Manner 1: The first terminal sends the first message to a first network device, to request the first network device to release the link between the first terminal and the second terminal.

Manner 2: The first terminal sends the first message to the first network device, and after receiving a response message of the first network device, the first terminal releases the link between the first terminal and the second terminal.

Specifically, the first message may be an RRC message. Optionally, the first message may include a reason for releasing the short-distance link by the relay terminal. For example, the relay terminal needs to perform a circuit switched fallback (CSFB), or the relay terminal has insufficient power supply. The examples are merely some embodiments provided in this application, and in actual application, another reason for releasing the short-distance link by the relay terminal may alternatively be included.

S202: The network device sends a second message to the remote terminal that is connected to the relay terminal, where the second message may be used to configure the remote terminal to switch from the indirect connection path to the direct connection path.

Specifically, the second message may be an RRC connection reconfiguration (RRC connection reconfiguration) message. The second message includes at least one of the following: a cell identity, random access configuration information, first instruction information, or a first time value.

The cell identity may be an identity of a cell accessed by the remote terminal after the remote terminal switches to the direct connection path. The cell identity may be a physical cell identity (PCI) of the cell, a cell identity ( ) that can uniquely identify the cell in a public land mobile network (PLMN), or a cell global identity (CGI) of the cell.

The random access (RA) configuration information may be resource configuration information for the remote terminal to initiate random access to the cell, and may include a random access preamble configuration and a physical random access channel configuration.

The first instruction information may be used to instruct the remote terminal whether to perform, before disconnecting from the relay terminal, downlink synchronization with a cell corresponding to the cell identity.

The first time value may be a longest time allowed for the remote terminal to access the cell corresponding to the cell identity. If the time is exceeded, it may be considered that the remote terminal fails to access the cell.

S203: After receiving the second message, the remote terminal may switch from the indirect connection path to the direct connection path and send a third message to the relay terminal. The third message may be used to instruct the relay terminal to release the short-distance link between the relay terminal and the remote terminal. After receiving the second message, the remote terminal may alternatively start a first timer, where a time length of the first timer is equal to the first time value in the second message, and is used to limit the longest time allowed for the remote terminal to access the cell corresponding to the cell identity. If the remote terminal has not accessed the cell when the first timer expires, it may be considered that cell access has failed. In this case, the remote terminal triggers a radio resource control connection reestablishment process.

In this embodiment, a time sequence in which the remote terminal triggers the relay terminal to release the short-distance link (that is, the remote terminal sends the third message) and the remote terminal switches from the indirect connection path to the direct connection path includes the following three manners:

Manner 1: Regardless of whether the second message includes the first instruction information, when performing the downlink synchronization with the cell corresponding to the cell identity, the remote terminal may continue to maintain a connection to the relay terminal, that is, continue to use the relay terminal to perform data communication with the network device. After completing the downlink synchronization with the cell corresponding to the cell identity, the remote terminal may send the third message to the relay terminal to trigger the relay terminal to release the short-distance link, so that the remote terminal terminates the data communication with the network device by using the relay terminal, and switches to the direct connection path for data communication with the network device.

Manner 2: Regardless of whether the second message includes the first instruction information, after receiving the second message, the remote terminal may directly send the third message to the relay terminal, trigger disconnection from the relay terminal, and terminate the data communication with the network device by using the relay terminal. Then, the remote terminal may start the downlink synchronization with the cell corresponding to the cell identity and start a random access process.

Manner 3: If the first message includes the first instruction information, and the first instruction information instructs the remote terminal to perform, before disconnecting from the relay terminal, the downlink synchronization with the cell corresponding to the cell identity, the remote terminal may perform path switching in Manner 1. If the first message includes the first instruction information, but the first instruction information does not instruct the remote terminal to perform, before disconnecting from the relay terminal, the downlink synchronization with the cell corresponding to the cell identity, the remote terminal may perform the path switching in Manner 2.

Manner 1 can ensure service continuity when the remote terminal switches from the indirect connection path to the direct connection path.

In a possible special case, before the remote terminal receives the second message, the relay terminal is disconnected from the link between the relay terminal and the remote terminal. In this case, when the remote terminal does not detect a discovery message sent by the relay terminal, the remote terminal determines that a failure has occurred over the link between the remote terminal and the relay terminal, and the remote terminal triggers the radio resource control connection reestablishment process.

S204: The remote terminal performs the downlink synchronization with the cell corresponding to the cell identity.

S205: After receiving the third message sent by the remote terminal, the relay terminal releases the short-distance link between the relay terminal and the remote terminal.

Herein, a specific implementation of releasing the short-distance link may include the following several aspects:

(1) releasing, by the relay terminal, sidelink bearers between the relay terminal and all remote terminals, including releasing radio link control (RLC) protocol entities and logical channels of all the sidelink bearers;

(2) releasing a sidelink-related configuration at a media access control (media access control, MAC) layer;

(3) releasing a sidelink-related configuration at a physical layer (PHY); and (4) releasing a resource pool and a resource configuration of all sidelinks.

S206: The remote terminal performs the random access process on the cell corresponding to the cell identity, and sends an RRC connection reconfiguration complete message to the network device after completing cell access.

It can be understood that, in the embodiment in FIG. 6, the relay terminal requests (by using the first message) the network device to trigger the path switching of the remote terminal, and the network device configures (for example, the cell identity and the random access configuration in the second message) for the path switching of the remote terminal. In the embodiment in FIG. 6, the release of the short-distance link between the relay terminal and the remote terminal is triggered by the remote terminal (by using the third message).

Figure 7:
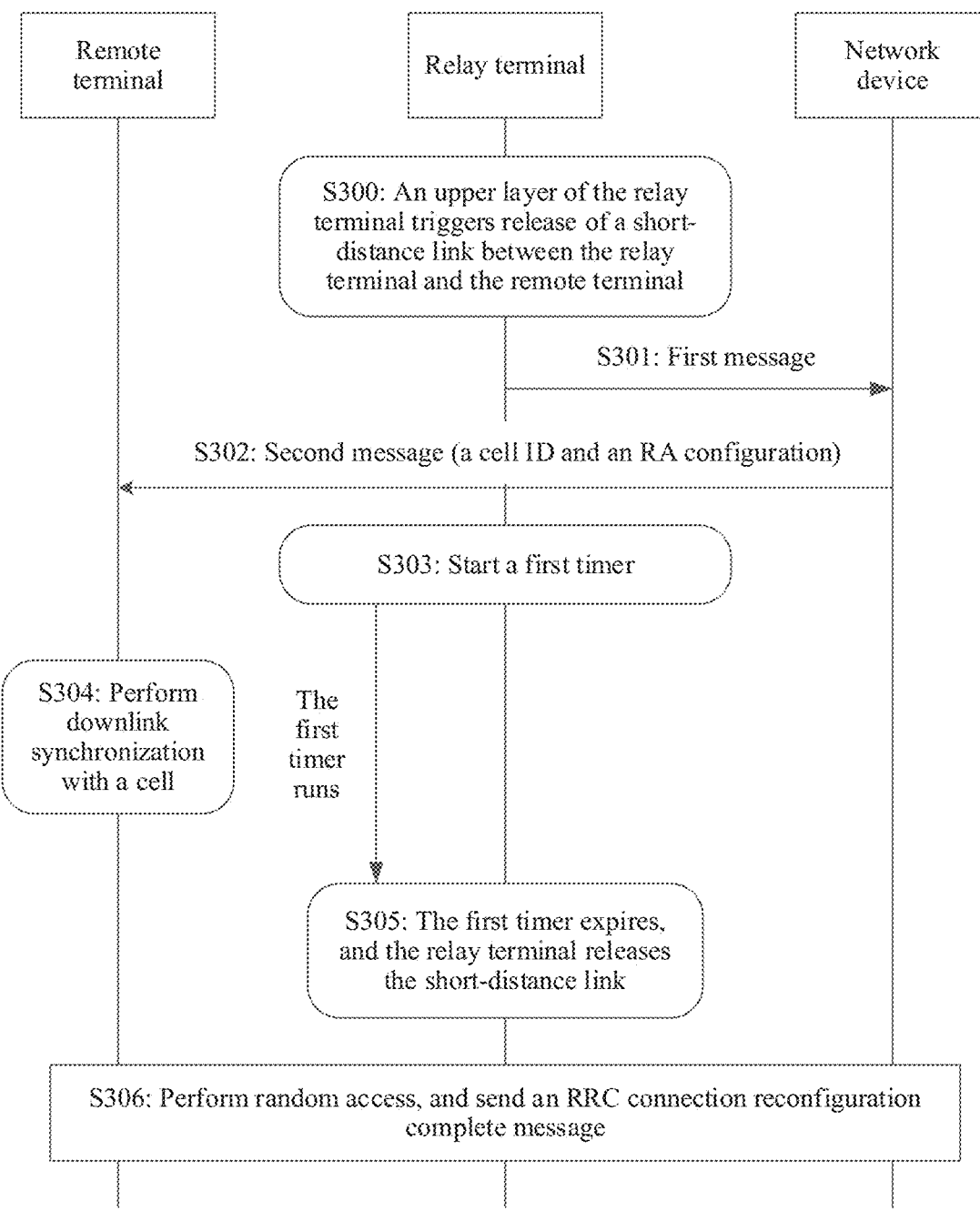
FIG. 7 is a schematic flowchart of still another path switching method according to an embodiment.

FIG. 7 is a schematic flowchart of still another path switching method according to this application. Details are provided in the following.

S300: An upper layer of a relay terminal triggers release of a short-distance link between the relay terminal and a remote terminal. In addition to a sidelink technology, a link between the relay device and the remote terminal may alternatively be a short-distance link in another form, for example, any one of links such as a WLAN link or a Bluetooth link.

S301: The relay terminal sends a first message to a network device, where the first message may be used to request the network device to switch the remote terminal from an indirect connection path to a direct connection path, or request to release a short-distance link connection between the relay terminal and the remote terminal.

Specifically, the requesting to release a link between the first terminal and the second terminal may include the following two manners:

Manner 1: The first terminal sends the first message to a first network device, to request the first network device to release the link between the first terminal and the second terminal.

Manner 2: The first terminal sends the first message to the first network device, and after receiving a response message of the first network device, the first terminal releases the link between the first terminal and the second terminal.

Specifically, the first message may be an RRC message. Optionally, the first message may include a reason for releasing the short-distance link by the relay terminal. For example, the relay terminal needs to perform a circuit switched fallback (CSFB), or the relay terminal has insufficient power supply. These are merely examples and in actual application, various reasons for releasing the short-distance link by the relay terminal may alternatively be included.

S302: The network device sends a second message to the remote terminal that is connected to the relay terminal, where the second message may be used to configure the remote terminal to switch from the indirect connection path to the direct connection path.

Specifically, the second message may be an RRC connection reconfiguration (RRC connection reconfiguration) message. The second message includes at least one of the following: a cell identity, random access configuration information, first instruction information, or a first time value. For specific definitions and explanations of content of the second message, refer to related content in the embodiment in FIG. 5 or FIG. 6. Details are not described herein again.

S303: After receiving the second message sent by the network device, the relay terminal may start a first timer, where a time length of the first timer is equal to the first time value in the second message, and is used to indicate a time of releasing the short-distance link by the relay terminal. In this way, the relay terminal may release the short-distance link when the first timer expires.

S304: The remote terminal performs downlink synchronization with a cell corresponding to the cell identity.

There is no time sequence between step 303 and step 304.

S305: When the first timer expires, the relay terminal releases the short-distance link between the relay terminal and the remote terminal.

Herein, a specific implementation of releasing the short-distance link may include the following several aspects:

(1) releasing, by the relay terminal, sidelink bearers between the relay terminal and all remote terminals, including releasing radio link control (RLC) protocol entities and logical channels of all the sidelink bearers;

(2) releasing a sidelink-related configuration at a media access control (media access control, MAC) layer;

(3) releasing a sidelink-related configuration at a physical layer (physical layer, PHY); and (4) releasing a resource pool and a resource configuration of all sidelinks.

S306: The remote terminal performs a random access process on the cell corresponding to the cell identity, and sends an RRC connection reconfiguration complete message to the network device after completing cell access.

Specifically, S306 may occur before S305, or S306 may occur after S305. A sequence between the two steps may specifically depend on a time required by the remote terminal to perform cell synchronization and the first time value. To ensure service continuity when the remote terminal performs the path switching, the first time value may be properly set to a relatively large value, so that the remote terminal can successfully access the cell and complete an RRC reconfiguration process before the first timer expires.

In a possible special case, before the remote terminal receives the second message, the relay terminal is disconnected from the link between the relay terminal and the remote terminal. In this case, when the remote terminal does not detect a discovery message sent by the relay terminal, the remote terminal determines that a failure occurs over the link between the remote terminal and the relay terminal, and the remote terminal triggers a radio resource control connection reestablishment process.

It can be understood that, in the embodiment in FIG. 7, the relay terminal requests (by using the first message) the network device to trigger the path switching of the remote terminal, and the network device configures (for example, the cell identity and the random access configuration in the second message) for the path switching of the remote terminal. In the embodiment in FIG. 7, the release of the short-distance link between the relay terminal and the remote terminal is triggered by the relay terminal (by using the first timer).

Solution 2 provided in this application is described in detail with reference to embodiments in FIG. 8 to FIG. 11.

Figure 8:
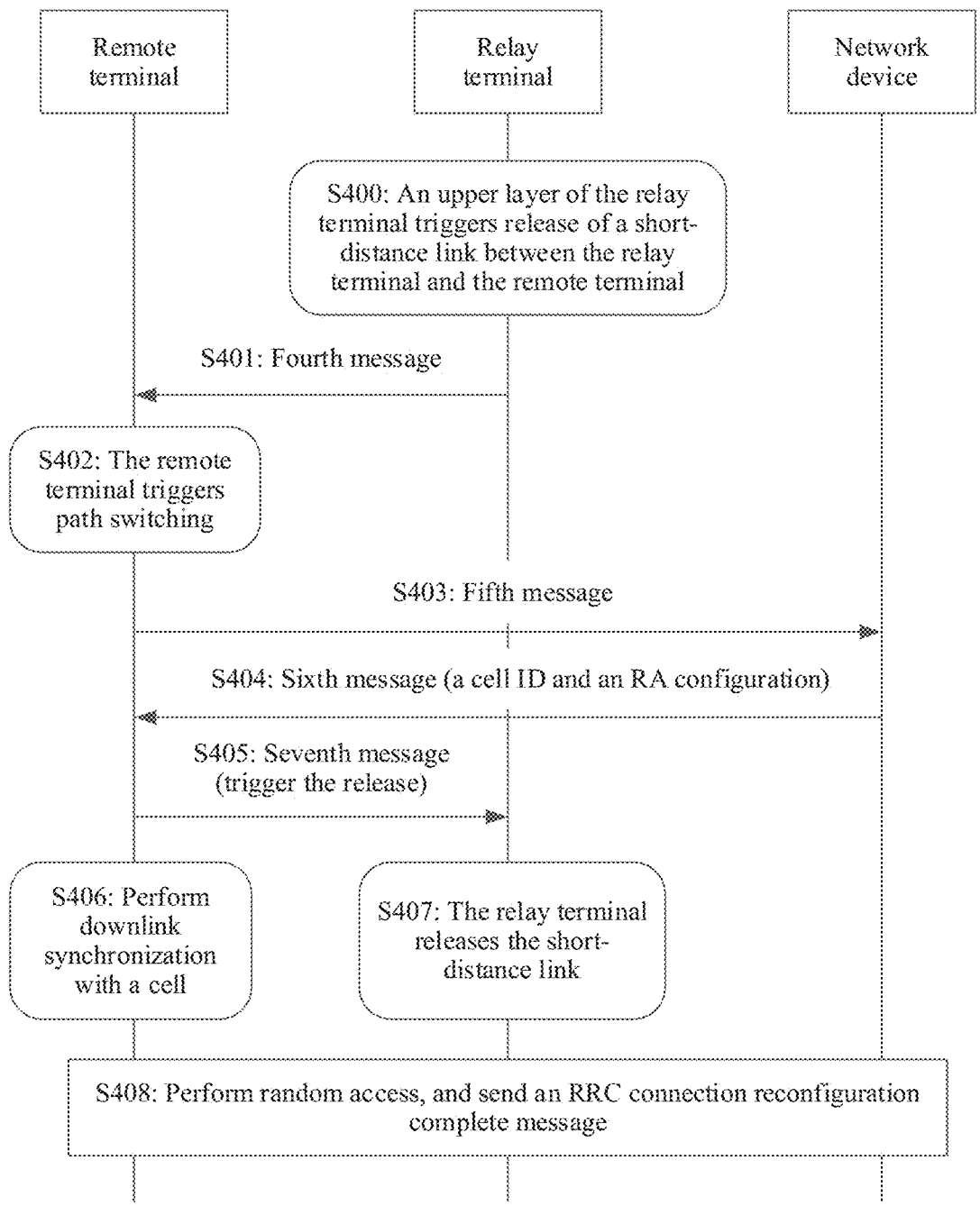
FIG. 8 is a schematic flowchart of still another path switching method according to an embodiment.

FIG. 8 is a schematic flowchart of still another path switching method according to this application. Details are provided in the following.

S400: An upper layer of a relay terminal triggers release of a short-distance link between the relay terminal and a remote terminal. In addition to a sidelink technology, a link between the relay device and the remote terminal may alternatively be a short-distance link in another form, for example, any one of links such as a WLAN link or a Bluetooth link.

S401: The relay terminal sends a fourth message to the remote terminal, where the fourth message may be used to notify that the short-distance link is to be released by the relay terminal, to instruct the remote terminal to switch from an indirect connection path to a direct connection path.

Specifically, the fourth message may be implemented as, but is not limited to, PC5 signaling. Optionally, the fourth message may include a reason for releasing the short-distance link by the relay terminal. For example, the relay terminal needs to perform a circuit switched fallback (CSFB), or the relay terminal has insufficient power supply. The examples are merely some embodiments provided in this application, and in actual application, another reason for releasing the short-distance link by the relay terminal may alternatively be included.

S402: After receiving the fourth message, the remote terminal triggers switching from the indirect connection path to the direct connection path.

In a possible special case, before the remote terminal receives the second message, the relay terminal is disconnected from the link between the relay terminal and the remote terminal. In this case, when the remote terminal does not detect a discovery message sent by the relay terminal, the remote terminal determines that a failure as occurred over the link between the remote terminal and the relay terminal, and the remote terminal triggers a radio resource control connection reestablishment process.

S403: The remote terminal sends a fifth message to a network device, where the fifth message may be used to request to switch from the indirect connection path to the direct connection path.

Optionally, the fifth message may include the reason for releasing the short-distance link by the relay terminal. Further, the fifth message may include link quality of the short-distance link between the remote terminal and the relay terminal.

S404: The network device sends a sixth message to the remote terminal, where the sixth message may be used to configure the remote terminal to switch from the indirect connection path to the direct connection path.

Specifically, the sixth message may be an RRC connection reconfiguration message. The sixth message includes at least one of the following: a cell identity, random access configuration information, first instruction information, or a first time value. Herein, the sixth message is equivalent to the second message in the embodiments in FIG. 5 to FIG. 7. For specific definitions and explanations of content of the sixth message, refer to related content of the second message in the embodiments in FIG. 5 to FIG. 7. Details are not described herein again.

S405: After receiving the sixth message, the remote terminal may switch from the indirect connection path to the direct connection path and send a seventh message to the relay terminal. Herein, the seventh message is equivalent to the third message in the embodiment in FIG. 6 and may be used to instruct the relay terminal to release the short-distance link between the relay terminal and the remote terminal. After receiving the seventh message, the remote terminal may alternatively start a first timer, where a time length of the first timer is equal to the first time value in the second message, and is used to limit a longest time allowed for the remote terminal to access a cell corresponding to the cell identity. If the remote terminal has not accessed the cell when the first timer expires, it may be considered that cell access has failed. In this case, the remote terminal triggers a radio resource control connection reestablishment process.

In this embodiment, a time sequence in which the remote terminal triggers the relay terminal to release the short-distance link (that is, the remote terminal sends the seventh message) and the remote terminal switches from the indirect connection path to the direct connection path includes the following three manners:

Manner 1: Regardless of whether the sixth message includes the first instruction information, when performing downlink synchronization with the cell corresponding to the cell identity, the remote terminal may continue to maintain a connection to the relay terminal, that is, continue to use the relay terminal to perform data communication with the network device. After completing the downlink synchronization with the cell corresponding to the cell identity, the remote terminal may send the seventh message to the relay terminal to trigger the relay terminal to release the short-distance link, so that the remote terminal terminates the data communication with the network device by using the relay terminal, and switches to the direct connection path for data communication with the network device.

Manner 2: Regardless of whether the sixth message includes the first instruction information, after receiving the second message, the remote terminal may directly send the seventh message to the relay terminal, trigger disconnection from the relay terminal, and terminate data communication with the network device by using the relay terminal. Then, the remote terminal may start downlink synchronization with the cell corresponding to the cell identity and start a random access process.

Manner 3: If the sixth message includes the first instruction information, and the first instruction information instructs the remote terminal to perform, before disconnecting from the relay terminal, downlink synchronization with the cell corresponding to the cell identity, the remote terminal may perform path switching in Manner 1. If the sixth message includes the first instruction information, but the first instruction information does not instruct the remote terminal to perform, before disconnecting from the relay terminal, downlink synchronization with the cell corresponding to the cell identity, the remote terminal may perform the path switching in Manner 2.

Manner 1 can ensure service continuity when the remote terminal switches from the indirect connection path to the direct connection path.

S406: The remote terminal performs the downlink synchronization with the cell corresponding to the cell identity.

S407: After receiving the seventh message sent by the remote terminal, the relay terminal releases the short-distance link between the relay terminal and the remote terminal.

Herein, a specific implementation of releasing the short-distance link may include the following several aspects:

(1) releasing, by the relay terminal, sidelink bearers between the relay terminal and all remote terminals, including releasing radio link control (RLC) protocol entities and logical channels of all the sidelink bearers;

(2) releasing a sidelink-related configuration at a media access control (MAC) layer;

(3) releasing a sidelink-related configuration at a physical layer (PHY); and (4) releasing a resource pool and a resource configuration of all sidelinks.

S408: The remote terminal performs the random access process on the cell corresponding to the cell identity and sends an RRC connection reconfiguration complete message to the network device after completing cell access.

It can be understood that, in the embodiment in FIG. 8, the relay terminal instructs (by using the fourth message) the remote terminal to perform the path switching. The remote terminal requests (by using the fifth message) the network device to configure the path switching (by using the sixth message). In the embodiment in FIG. 8, the release of the short-distance link between the relay terminal and the remote terminal is triggered by the remote terminal (by using the seventh message).

Figure 9:
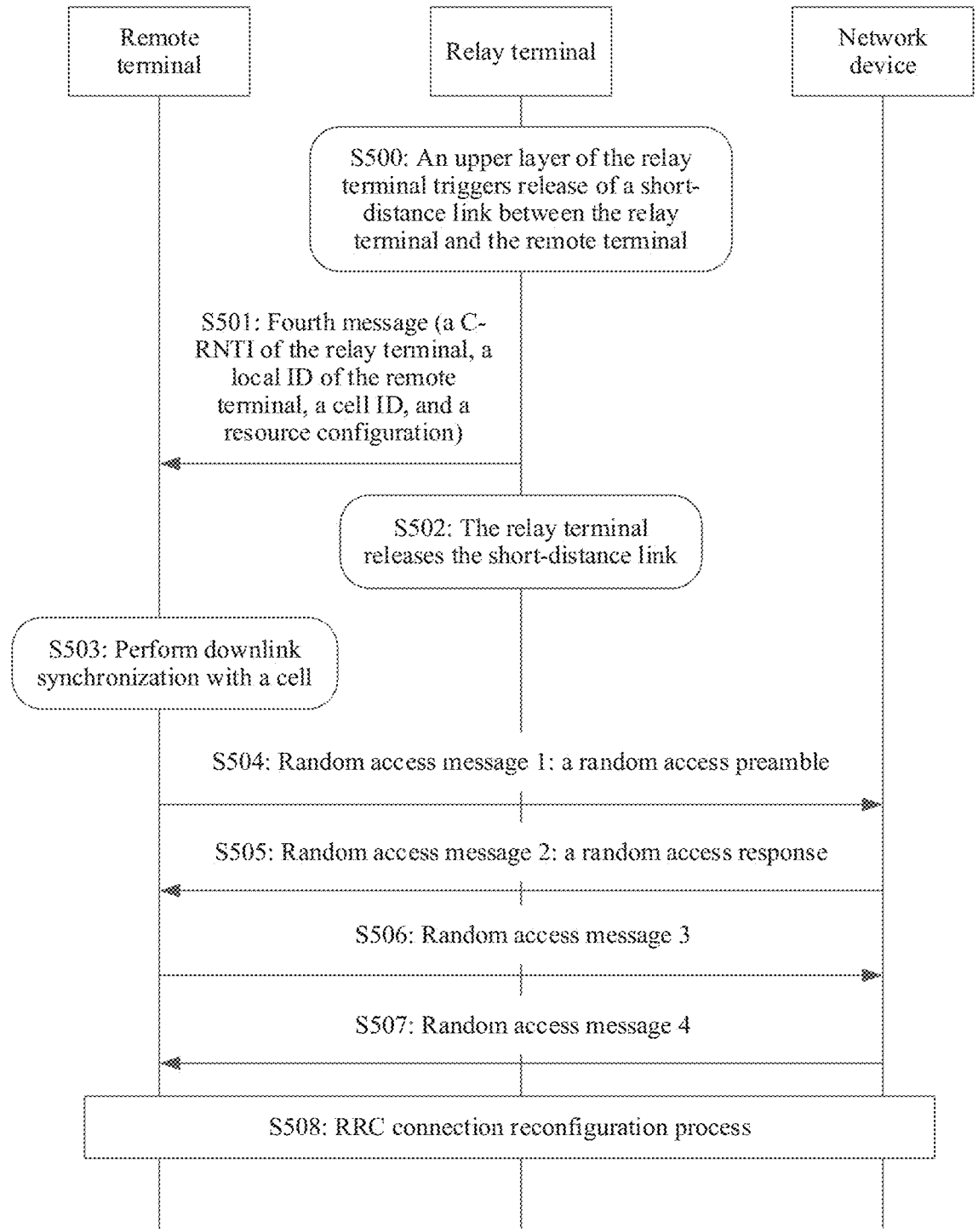
FIG. 9 is a schematic flowchart of still another path switching method according to an embodiment.

FIG. 9 is a schematic flowchart of still another path switching method according to this application. In the embodiment in FIG. 9, in a cell in which a network device is located, a remote terminal side has no cell radio network temporary identifier (C-RNTI). Details are provided in the following.

S500: An upper layer of a relay terminal triggers release of a short-distance link between the relay terminal and the remote terminal. In addition to a sidelink technology, a link between the relay device and the remote terminal may alternatively be a short-distance link in another form, for example, any one of links such as a W LAN link or a Bluetooth link.

S501: The relay terminal sends a fourth message to the remote terminal, where the fourth message may be used to notify the remote terminal that the short-distance link is to be released by the relay terminal, to instruct the remote terminal to switch from an indirect connection path to a direct connection path.

Specifically, the fourth message may be implemented as, but is not limited to, PC5 signaling. The fourth message may include: a C-RNTI of the relay terminal, a local identifier (local ID) of the remote terminal, common radio resource configuration information of a serving cell of the relay terminal, and a cell identity of the serving cell of the relay terminal. Herein, the C-RNTI of the relay terminal and the local ID of the remote terminal may be used to identify a temporary identity of the remote terminal on a network side.

Optionally, the fourth message may further include a reason for releasing the short-distance link by the relay terminal. For example, the relay terminal needs to perform a circuit switched fallback (CSFB), or the relay terminal has insufficient power supply. These are merely examples and in actual application, other reasons for releasing the short-distance link by the relay terminal may alternatively be included.

S502: After sending the fourth message to the remote terminal, the relay terminal may release the short-distance link between the relay terminal and the remote terminal.

Herein, a specific implementation of releasing the short-distance link may include the following several aspects:

(1) releasing, by the relay terminal, sidelink bearers between the relay terminal and all remote terminals, including releasing radio link control (RLC) protocol entities and logical channels of all the sidelink bearers;

(2) releasing a sidelink-related configuration at a media access control (MAC) layer;

(3) releasing a sidelink-related configuration at a physical layer (PHY); and (4) releasing a resource pool and a resource configuration of all sidelinks.

S503: After receiving the fourth message, the remote terminal triggers switching from the indirect connection path to the direct connection path, performs downlink synchronization with a cell corresponding to the cell identity in the fourth message, and triggers a random access process.

After receiving the fourth message, the remote terminal may alternatively start a first timer. A time length value of the first timer may be indicated by the relay device by using the fourth message, or may be a predefined value, and is used to limit a longest time allowed for the remote terminal to access the cell corresponding to the cell identity. If the remote terminal has not accessed the cell when the first timer expires, it may be considered that cell access has failed. In this case, the remote terminal triggers a radio resource control connection reestablishment process.

In a possible special case, before the remote terminal receives the fourth message, the relay terminal is disconnected from the link between the relay terminal and the remote terminal. In this case, when the remote terminal does not detect a discovery message sent by the relay terminal, the remote terminal determines that a failure has occurred over the link between the remote terminal and the relay terminal, and the remote terminal triggers a radio resource control connection reestablishment process.

S504 and S505: The remote terminal and the network device perform the first step and the second step of random access. To be specific, the remote terminal sends a random access preamble (preamble) to the network device, and the network device feeds back a random access response to the remote terminal.

S506: The remote terminal sends a random access message 3 (MSG 3) to the network device. The message 3 may include a C-RNTI of the relay terminal and a local identifier (local ID) of the remote terminal. Specifically, the message 3 may be an RRC message or an MAC control entity (MAC control element. MAC CE).

S507: The network device returns a random access message 4 (MSG 4) to the remote terminal. The message 4 may include same content as that in the random access message 3 sent by the remote terminal. The message 4 may be an RRC message or an MAC CE.

S508: An RRC connection reconfiguration process is performed between the remote terminal and the network device to establish the direct connection path.

It can be understood that, in the embodiment in FIG. 9, in the cell in which the network device is located, the remote terminal has no C-RNTI. The relay terminal instructs (by using the fourth message) the remote terminal to perform path switching, and configures (for example, the C-RNTI of the relay terminal, the local ID of the remote terminal, the cell ID, and the radio resource configuration information) for the path switching of the remote terminal. In the embodiment in FIG. 9, the relay terminal releases the short-distance link after sending the fourth message to the remote device, without requiring a trigger condition.

Figure 10:
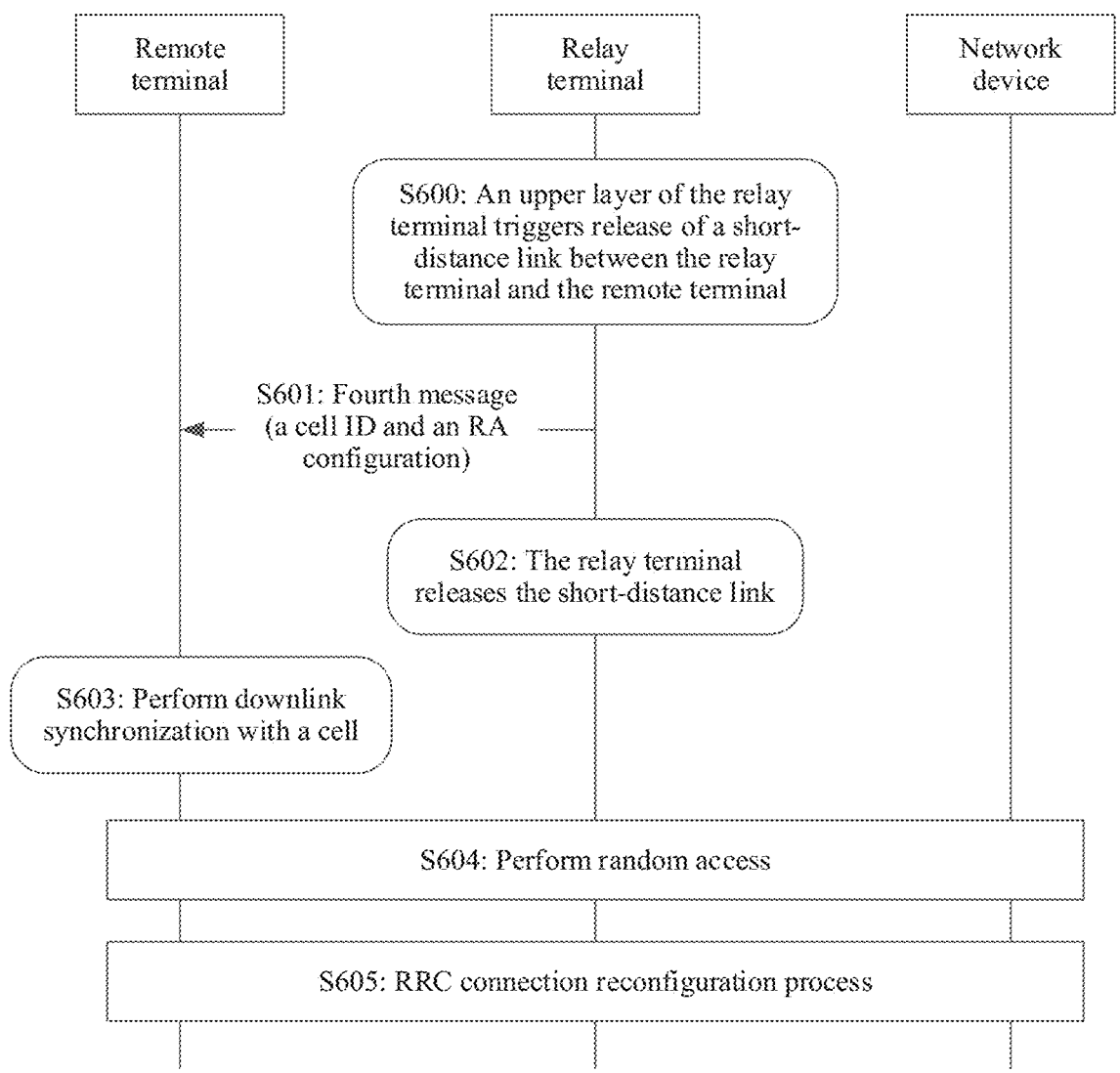
FIG. 10 is a schematic flowchart of still another path switching method according to an embodiment.

FIG. 10 is a schematic flowchart of still another path switching method according to this application. In the embodiment in FIG. 10, in a cell in which a network device is located, a remote terminal side has a cell radio network temporary identifier (Cell Radio Network Temporary Identifier, C-RNTI). The C-RNTI of the remote terminal may be sent to the remote terminal by the network device by using a relay terminal when the remote terminal establishes a short-distance communication connection to the relay terminal, or may be directly obtained by the remote terminal from the network device when a direct connection path is being established. Details are provided in the following.

S600: An upper layer of the relay terminal triggers release of a short-distance link between the relay terminal and the remote terminal. In addition to a sidelink technology, a link between the relay device and the remote terminal may alternatively be a short-distance link in another form, for example, any one of links such as a WLAN link or a Bluetooth link.

S601: The relay terminal sends a fourth message to the remote terminal, where the fourth message may be used to notify that the short-distance link is to be released by the relay terminal, to instruct the remote terminal to switch from an indirect connection path to a direct connection path.

Specifically, the fourth message may be implemented as, but is not limited to, PC5 signaling. The fourth message may include common radio resource configuration information of a serving cell of the relay terminal, and a cell identity of the serving cell of the relay terminal. Optionally, the fourth message may further include a reason for releasing the short-distance link by the relay terminal. For example, the relay terminal needs to perform a circuit switched fallback (CSFB), or the relay terminal has insufficient power supply. The examples are merely some embodiments provided in this application, and the fourth message may alternatively include another reason for releasing the short-distance link by the relay terminal. This is not limited herein.

S602: After sending the fourth message to the remote terminal, the relay terminal releases the short-distance link between the relay terminal and the remote terminal.

Herein, a specific implementation of releasing the short-distance link may include the following several aspects:

(1) releasing, by the relay terminal, sidelink bearers between the relay terminal and all remote terminals, including releasing radio link control (RLC) protocol entities and logical channels of all the sidelink bearers;

(2) releasing a sidelink-related configuration at a media access control (MAC) layer;

(3) releasing a sidelink-related configuration at a physical layer (PHY); and (4) releasing a resource pool and a resource configuration of all sidelinks.

S603: After receiving the fourth message sent by the relay terminal, the remote terminal triggers switching from the indirect connection path to the direct connection path and performs downlink synchronization with a cell corresponding to the cell identity in the fourth message.

After receiving the fourth message, the remote terminal may alternatively start a first timer. A time length value of the first timer may be indicated by the relay device by using the fourth message, or may be a predefined value, and is used to limit a longest time allowed for the remote terminal to access the cell corresponding to the cell identity. If the remote terminal has not accessed the cell when the first timer expires, it may be considered that cell access has failed. In this case, the remote terminal triggers a radio resource control connection reestablishment process.

In a possible special case, before the remote terminal receives the fourth message, the relay terminal is disconnected from the link between the relay terminal and the remote terminal. In this case, when the remote terminal does not detect a discovery message sent by the relay terminal, the remote terminal determines that a failure has occurred over the link between the remote terminal and the relay terminal, and the remote terminal triggers the radio resource control connection reestablishment process.

S604: The remote terminal performs a random access process.

S605: An RRC connection reconfiguration process is performed between the remote terminal and the network device to establish the direct connection path.

It can be understood that, in the embodiment in FIG. 10, in the cell in which the network device is located, the remote terminal has a C-RNTI. The relay terminal instructs (by using the fourth message) the remote terminal to perform path switching, and configures (for example, the cell ID and the radio resource configuration information) for the path switching of the remote terminal. In the embodiment in FIG. 10, the relay terminal releases the short-distance link after sending the fourth message to the remote terminal, without requiring a trigger condition.

Figure 11:
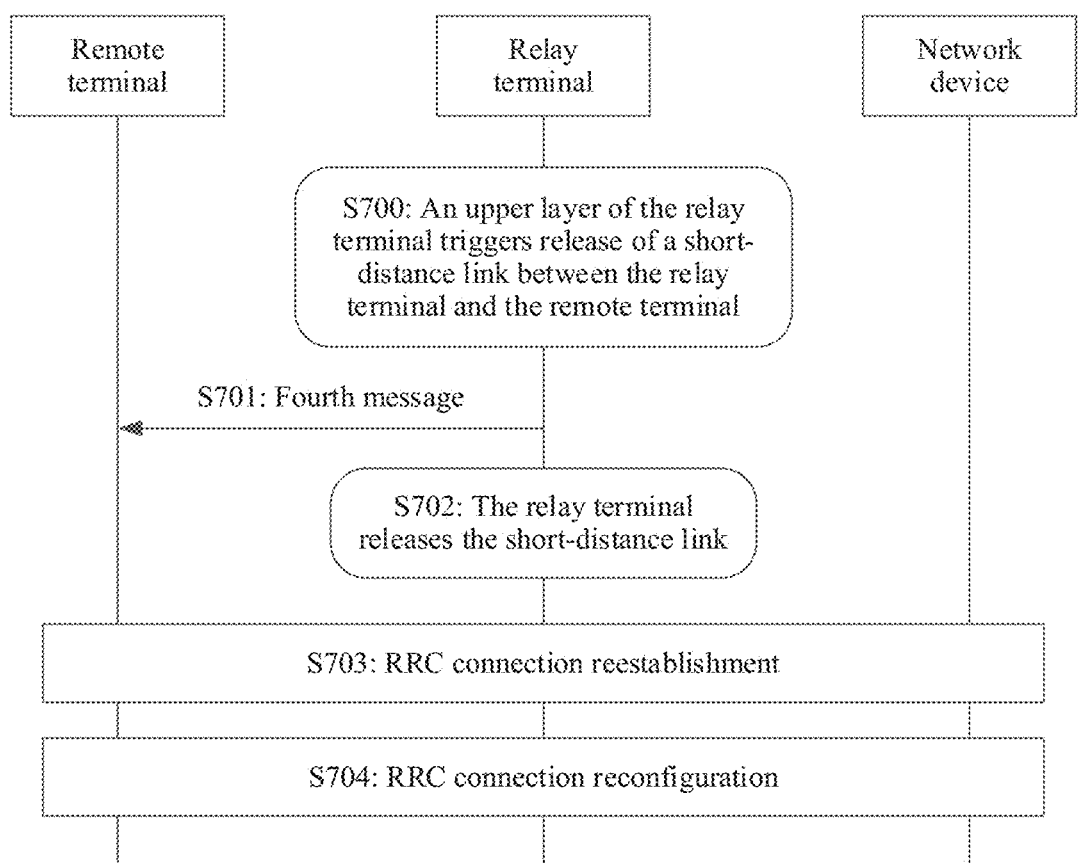
FIG. 11 is a schematic flowchart of still another path switching method according to an embodiment.

FIG. 11 is a schematic flowchart of still another path switching method according to this application. In the embodiment in FIG. 11, in a cell in which a network device is located, a remote terminal side has a cell radio network temporary identifier (Cell Radio Network Temporary Identifier, C-RNTI). The C-RNTI of the remote terminal may be sent to the remote terminal by the network device by using a relay terminal when the remote terminal establishes a short-distance communication connection to the relay terminal, or may be directly obtained by the remote terminal from the network device when a direct connection path is being established. Details are provided in the following.

S700: An upper layer of the relay terminal triggers release of a short-distance link between the relay terminal and the remote terminal. In addition to a sidelink technology, a link between the relay device and the remote terminal may alternatively be a short-distance link in another form, for example, a WLAN link or a Bluetooth link.

S701: The relay terminal sends a fourth message to the remote terminal, where the fourth message may be used to notify that the short-distance link is to be released by the relay terminal, to instruct the remote terminal to switch from an indirect connection path to a direct connection path.

Specifically, the fourth message may be implemented as, but is not limited to, PC5 signaling. Optionally, the fourth message may include a reason for releasing the short-distance link by the relay terminal. For example, the relay terminal needs to perform a circuit switched fallback (CSFB), or the relay terminal has insufficient power. These are merely examples and the fourth message may alternatively include other reasons for releasing the short-distance link by the relay terminal.

S702: After sending the fourth message to the remote terminal, the relay terminal releases the short-distance link between the relay terminal and the remote terminal.

Herein, a specific implementation of releasing the short-distance link may include the following several aspects:

(1) releasing, by the relay terminal, sidelink bearers between the relay terminal and all remote terminals, including releasing radio link control (RLC) protocol entities and logical channels of all the sidelink bearers;

(2) releasing a sidelink-related configuration at a media access control (MAC) layer;

(3) releasing a sidelink-related configuration at a physical layer (PHY); and (4) releasing a resource pool and a resource configuration of all sidelinks.

S703: After receiving the fourth message sent by the relay terminal, the remote terminal initiates an RRC reestablishment process.

In a possible special case, before the remote terminal receives the fourth message, the relay terminal is disconnected from the link between the relay terminal and the remote terminal. In this case, when the remote terminal does not detect a discovery message sent by the relay terminal, the remote terminal determines that a failure has occurred over the link between the remote terminal and the relay terminal, and the remote terminal triggers a radio resource control connection reestablishment process.

S704: An RRC connection reconfiguration process is performed between the remote terminal and the network device to establish the direct connection path.

It can be understood that, in the embodiment in FIG. 11, the relay terminal only instructs (by using the fourth message) the remote terminal to perform path switching and does not configure for the path switching. After receiving the fourth message, the remote terminal triggers the RRC connection reestablishment, and performs RRC reconfiguration based on the reestablished RRC connection (the direct connection path).

In the embodiments (the embodiments in FIG. 5 to FIG. 7) in Solution 1, the releasing the short-distance link between the relay terminal and the remote terminal may include the following several implementations.

Implementation 1: The release of the short-distance link between the relay terminal and the remote terminal is triggered by the network device. Refer to FIG. 5.

Specifically, after the network device configures for link switching of the remote terminal (that is, after the network device sends the second message to the remote terminal), the network device sends the third message to the relay terminal, to trigger the relay terminal to release the short-distance link.

Implementation 2: The release of the short-distance link between the relay terminal and the remote terminal is triggered by the remote terminal. Refer to FIG. 6.

Specifically, after the remote terminal receives link switching configuration information sent by the network device (that is, after the remote terminal receives the second message sent by the network device), the remote terminal sends the third message to the relay terminal, to trigger the relay terminal to release the short-distance link.

Implementation 3: After the relay terminal requests to release the short-distance communication link (that is, after the relay terminal sends the first message to the network device) and when the time for maintaining the short-distance link by the relay terminal exceeds the first time length, the relay terminal releases the short-distance link. Refer to FIG. 7.

In this application, the several implementations of releasing the short-distance link between the relay terminal and the remote terminal in Solution 1 may also be applicable to the embodiments in Solution 2.

In the embodiments (the embodiments in FIG. 8 to FIG. 11) in Solution 2, the releasing the short-distance link between the relay terminal and the remote terminal may include the following several implementations.

Implementation 1: The release of the short-distance link between the relay terminal and the remote terminal is triggered by the network device.

Specifically, after the network device configures for link switching of the remote terminal (that is, after the network device sends the sixth message to the remote terminal), the network device sends the seventh message to the relay terminal, to trigger the relay terminal to release the short-distance link.

Implementation 2: The release of the short-distance link between the relay terminal and the remote terminal is triggered by the remote terminal, as shown in FIG. 8.

Specifically, after the remote terminal receives the link switching configuration information sent by the network device (that is, after the remote terminal receives the sixth message sent by the network device), the remote terminal sends the seventh message to the relay terminal, to trigger the relay terminal to release the short-distance link.

Implementation 3: After the relay terminal instructs to release the short-distance communication link (that is, after the relay terminal sends the fourth message to the remote terminal), when the time for maintaining the short-distance link by the relay terminal exceeds a specified time threshold, the relay terminal releases the short-distance link. The specified time threshold may be set by the relay terminal according to an actual requirement.

In addition, in Solution 2, the relay terminal may alternatively directly release the short-distance link after instructing to release the short-distance link, without requiring a trigger condition. For details, refer to the embodiments in FIG. 9 to FIG. 11.

In addition, the path switching method provided in this application may further be applicable to a cell handover scenario. In the cell handover scenario, a remote terminal may alternatively switch from an indirect connection path to another network device (which may be referred to as a second network device) that is different from a network device (which may be referred to as a first network device) connected to a relay terminal.

The following uses the embodiments in FIG. 5 and FIG. 8 as examples, to describe a path switching method in the cell handover scenario.

Figure 12:
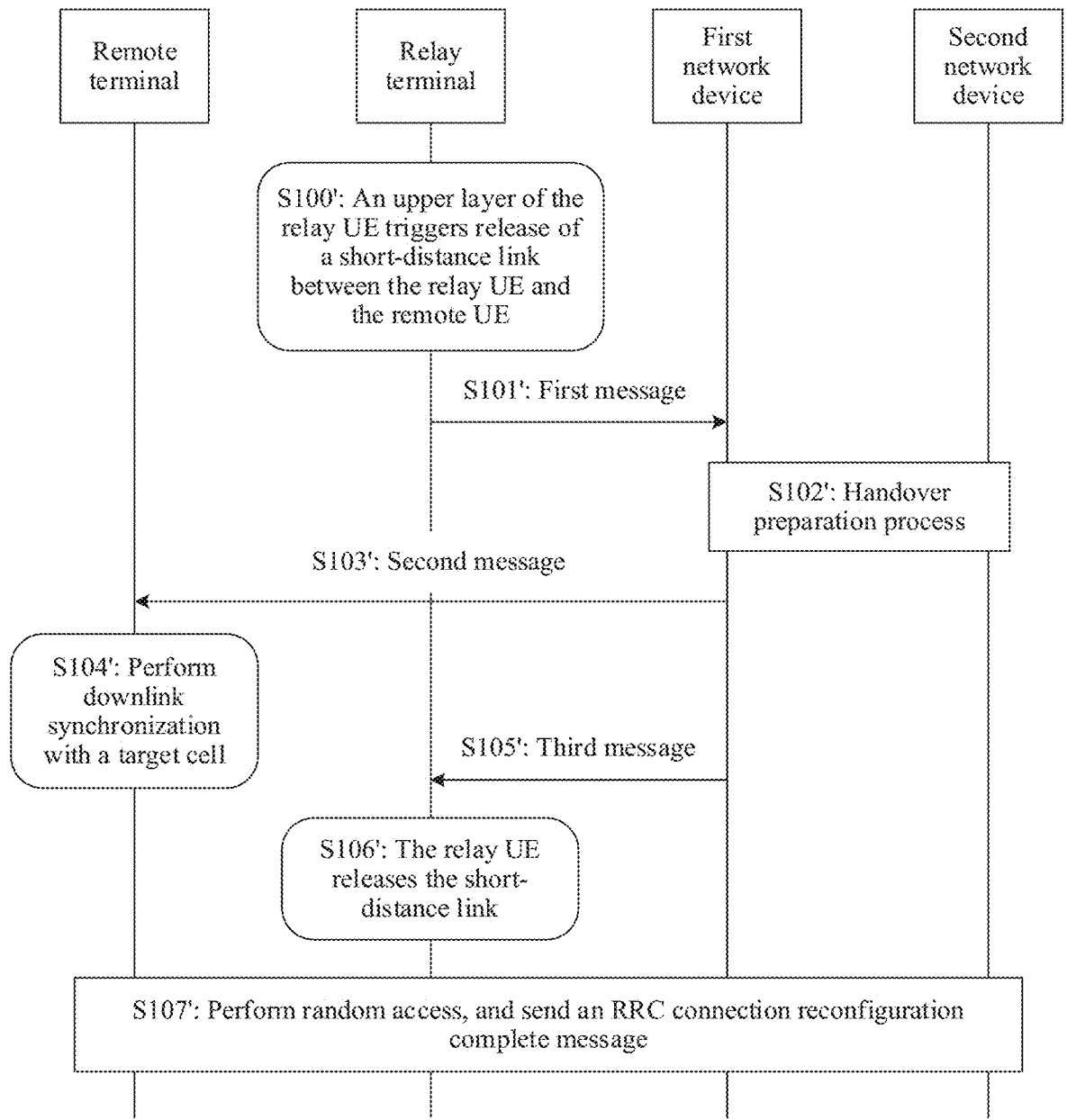
FIG. 12 is a schematic flowchart of still another path switching method according to an embodiment.

Based on the embodiment in FIG. 5, FIG. 12 shows a path switching method in a cell handover scenario according to this application.

A difference from the embodiment in FIG. 5 lies in that, in the embodiment in FIG. 12, a handover preparation process needs to be performed between the first network device and the second network device, and reference may be made to S102'. In addition, a time point at which a third message is sent by the first network device may be either of the following:

after the first network device sends a second message; and
after the first network device receives an HARQ ACK or an RLC ACK that is sent by the remote terminal and that is specific to the second message.

Figure 13:
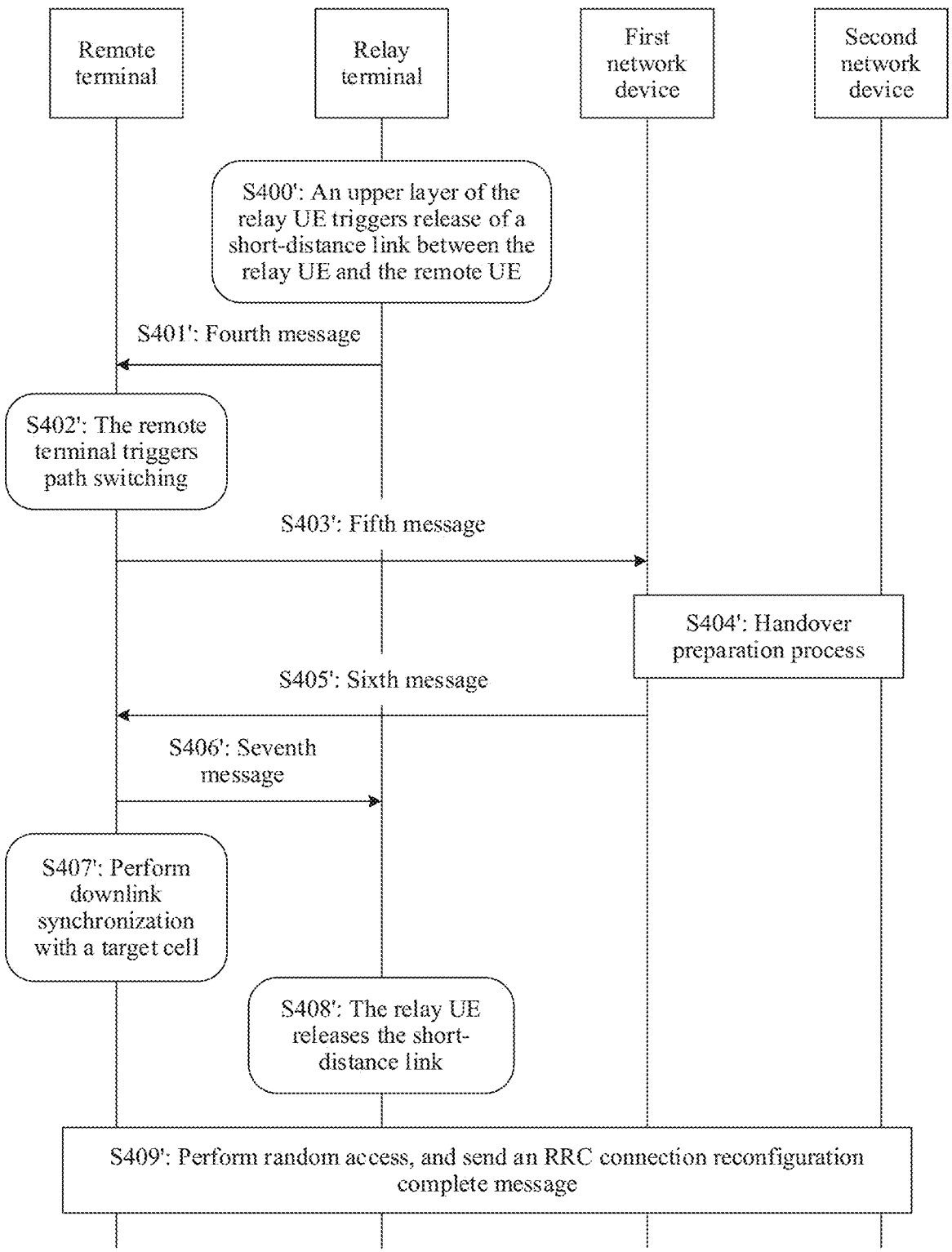
FIG. 13 is a schematic flowchart of still another path switching method according to an embodiment.

Based on the embodiment in FIG. 8, FIG. 13 shows another path switching method in a cell handover scenario according to this application.

A difference from the embodiment in FIG. 8 lies in that, in the embodiment in FIG. 13, a handover preparation process needs to be performed between the first network device and the second network device, and reference may be made to S404'.

It can be learned from the examples in FIG. 12 and FIG. 13 that, based on the embodiments in FIG. 5 to FIG. 11 provided in this application, the path switching method in the cell handover scenario further needs to include the cell handover preparation process between the first network device and the second network device.

Figure 1A:
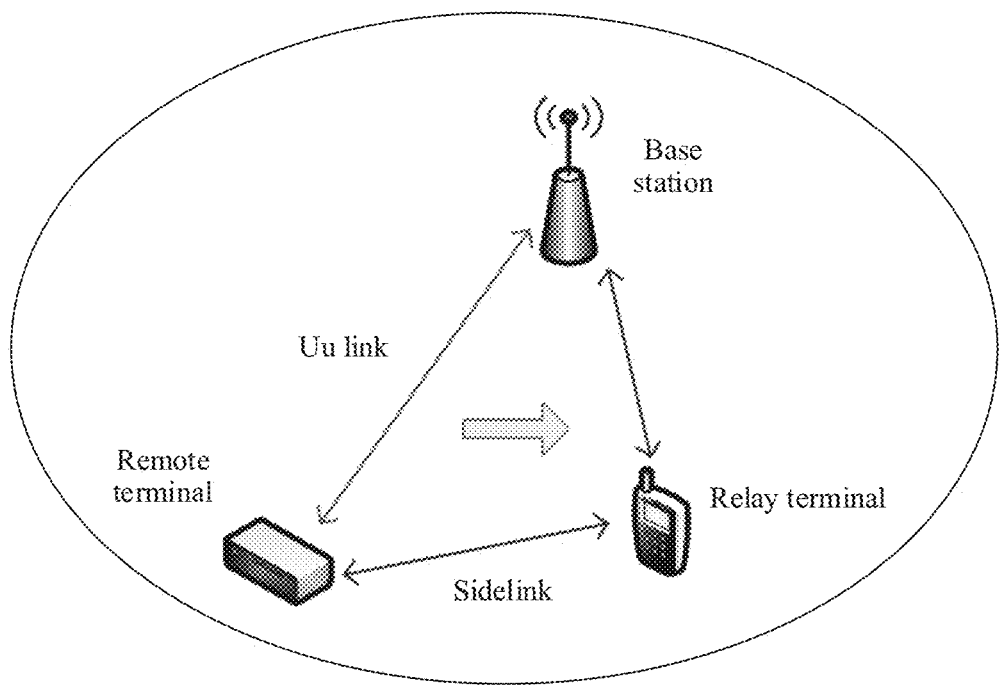
FIG. 1A and FIG. 1B show two scenarios of path switching in a relay system according to an embodiment.
Figure 1B:
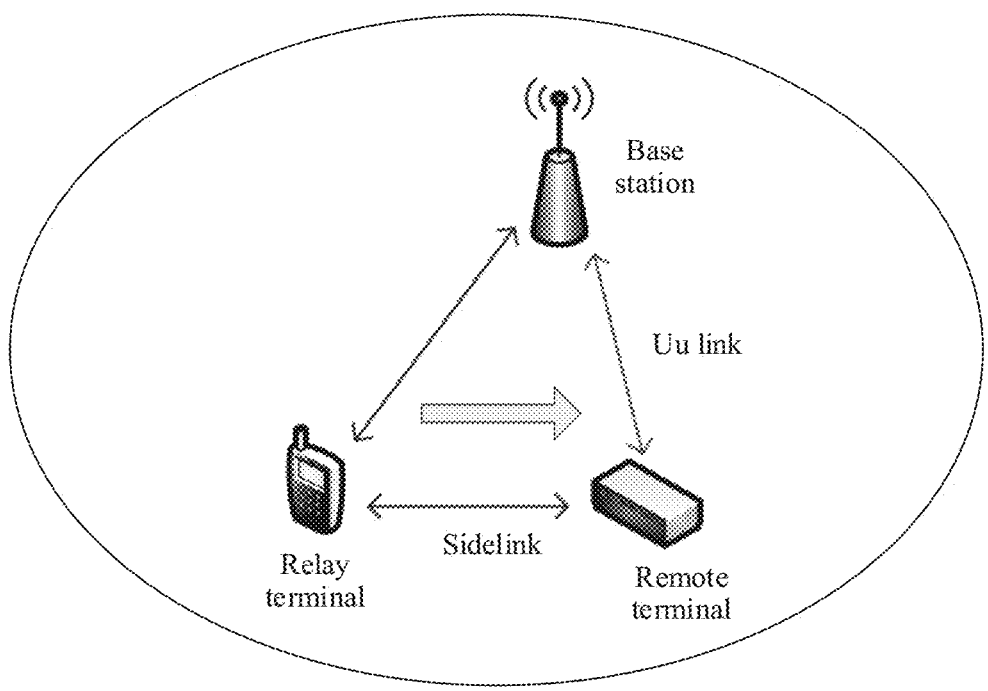
Figure 14:
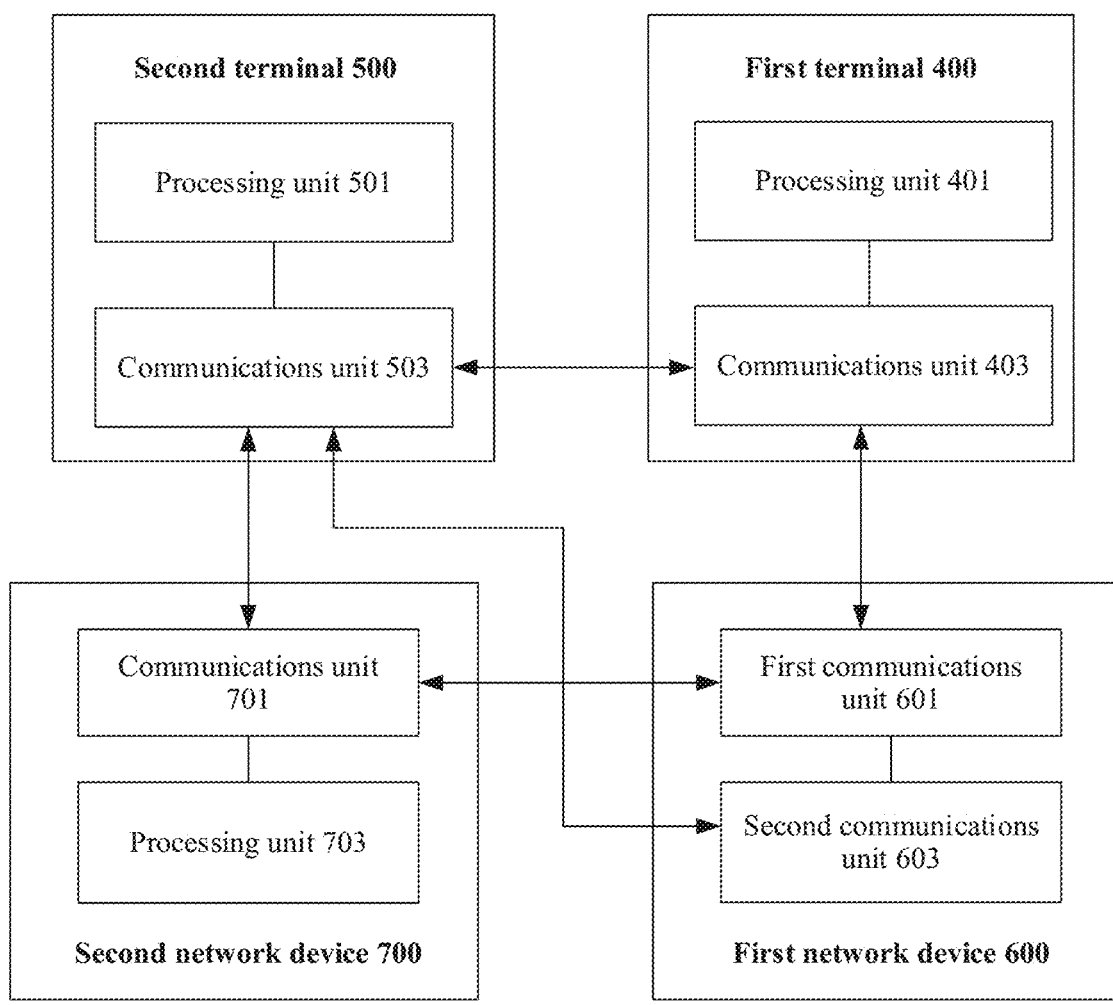
FIG. 14 is a schematic structural diagram of a relay terminal, a remote terminal, a network device, and a wireless communications system according to an embodiment.

FIG. 14 shows a wireless communications system, a terminal, and a network device according to this application. The wireless communications system 10 may include: a first terminal 400, a second terminal 500, and a first network device 600. Optionally, the wireless communications system 10 may further include a second network device 700. The first terminal 400 or the second terminal 500 may be the terminal 200 in the embodiments in FIG. 3. The first network device 600 or the second network device 700 may be the network device 300 in the embodiments in FIG. 4. The wireless communications system 10 may be the wireless communications system 100 shown in FIG. 1. In this application, the wireless communications system 10 may use two different path switching solutions. The following separately describes the two solutions.

Solution 1: The first terminal 400 requests the network device 600 to trigger the second terminal 500 to perform path switching, and the network device 600 configures for the path switching. Optionally, the second terminal 500 may switch from an indirect connection path to a network device that is different from the first network device 600 connected to the first terminal 400, that is, switch to the second network device 700. The following separately describes implementations of the first terminal 400, the second terminal 500, the first network device 600, and the second network device 700.

As shown in FIG. 14, the first terminal 400 may include a processing unit 401 and a communications unit 403.

The communications unit 403 may be configured to send a first message to the first network device 600.

The first message herein may be used to request to switch the second terminal 500 from an indirect connection path for communicating with the first network device 600 by using the first terminal 400 to a direct connection path for communicating with the first network device 600 or the second network device 700. Alternatively, the first message may be used to request to release a link between the first terminal 400 and the second terminal 500.

The processing unit 401 may be configured to release the link between the first terminal 400 and the second terminal 500.

Specifically, the processing unit 401 may be configured to release the link between the first terminal 400 and the second terminal 500 in the following several manners.

(1) The processing unit 401 may be configured to release the link after receiving a third message.

The third message herein may be sent by the first network device 600 or the second terminal 500 after the first network device 600 sends a second message to the second terminal 500 and is used to instruct the first terminal 400 to release the link.

The second message may include at least one of the following: a cell identity, random access configuration information, first instruction information, or a first time value, and is used to configure the second terminal 500 to switch from the indirect connection path to the direct connection path.

The first instruction information may be used to instruct the second terminal 500 whether to perform, before disconnecting from the first terminal 400, downlink synchronization with a cell corresponding to the cell identity. The first time value may be a longest time allowed for the second terminal 500 to access the cell corresponding to the cell identity.

(2) The processing unit 401 may be configured to release the link when a time length for maintaining the link after the communications unit 403 sends the first message exceeds a first time length.

As shown in FIG. 14, the first network device 600 may include a first communications unit 601 and a second communications unit 603.

The communications unit 601 may be configured to receive the first message sent by the first terminal 400.

Herein, the first message may be used to request to switch the second terminal 500 from the indirect connection path for communicating with the first network device 600 by using the first terminal 400 to the direct connection path for communicating with the first network device 600 or the second network device 700. Alternatively, the first message is used to request to release the link between the first terminal 400 and the second terminal 500. The first network device 600 is different from the second network device 700.

The communications unit 601 may be further configured to send the second message to the second terminal 500, where the second message may be used to configure the second terminal 500 to switch from the indirect connection path to the direct connection path.

Specifically, the second message may include at least one of the following: the cell identity, the random access configuration information, the first instruction information, or the first time value. The first instruction information may be used to instruct the second terminal 500 whether to perform, before disconnecting from the relay terminal 400, the downlink synchronization with the cell corresponding to the cell identity. The first time value may be the longest time allowed for the second terminal 500 to access the cell corresponding to the cell identity.

As shown in FIG. 14, the second terminal 500 may include a processing unit 501 and a communications unit 503.

The communications unit 503 may be configured to receive the second message sent by the first network device 600. The second message may be used to configure the second terminal 500 to switch from the indirect connection path for communicating with the first network device 600 by using the first terminal 400 to the direct connection path for communicating with the first network device 600 or the second network device 700.

The processing unit 501 may be configured to switch from the indirect connection path to the direct connection path according to the second message.

Specifically, the second message may include at least one of the following: the cell identity, the random access configuration information, the first instruction information, or the first time value. The first instruction information may be used to instruct the second terminal 500 whether to perform, before disconnecting from the first terminal 400, the downlink synchronization with the cell corresponding to the cell identity. The first time value may be used to instruct the longest time allowed for the second terminal 500 to access the cell corresponding to the cell identity.

It can be understood that, for specific implementations of the first terminal 400, the second terminal 500, the first network device 600, and the second network device 700 in Solution 1, reference may be made to the embodiments in FIG. 5 to FIG. 7, or the embodiment in FIG. 12, and another implementation related to Solution 2. Details are not described herein again.

Solution 2: The first terminal 400 directly instructs the second terminal 500 to perform path switching. Optionally, the second terminal 500 may switch from an indirect connection path to a network device that is different from the first network device 600 connected to the first terminal 400, that is, the second network device 700. The following separately describes implementations of the first terminal 400, the second terminal 500, the first network device 600, and the second network device 700.

As shown in FIG. 14, the first terminal 400 may include a processing unit 401 and a communications unit 403.

The communications unit 403 may be configured to send a fourth message to the second terminal.

The fourth message herein may be used to instruct the second terminal to switch from an indirect connection path for communicating with the first network device by using the first terminal to a direct connection path for communicating with the first network device or the second network device. Alternatively, the fourth message may be used to instruct to release a link between the first terminal and the second terminal.

The processing unit 401 may be configured to release the link between the first terminal and the second terminal.

Specifically, the processing unit 401 may be configured to release the link between the first terminal 400 and the second terminal 500 in the following several manners.

(1) The processing unit 401 may be configured to release the link after receiving a seventh message.

The seventh message herein may be sent by the first network device or the second terminal after the first network device sends a sixth message to the second terminal and is used to instruct the first terminal to release the link.

The sixth message may include at least one of the following: a cell identity, random access configuration information, first instruction information, or a first time value, and is used to configure the second terminal to switch from the indirect connection path to the direct connection path.

(2) The processing unit 401 may be configured to release the link when a time length for maintaining the link after the first terminal sends the fourth message exceeds a first time length.

Specifically, the fourth message may include at least one of the following: a cell identity of a serving cell of the first terminal, or common radio resource configuration information of a serving cell of the first terminal.

As shown in FIG. 14, the second terminal 500 may include a processing unit 501 and a communications unit 503.

The communications unit 503 may be configured to receive the fourth message sent by the first terminal.

The fourth message may be used to instruct the second terminal to switch from the indirect connection path for communicating with the first network device by using the first terminal to the direct connection path for communicating with the first network device or the second network device. Alternatively, the fourth message may be used to instruct to release the link between the first terminal and the second terminal.

The processing unit 501 may be configured to switch from the indirect connection path to the direct connection path according to the fourth message.

Specifically, the fourth message may include at least one of the following: the cell identity of the serving cell of the first terminal, or the common radio resource configuration information of the serving cell of the first terminal.

In an optional embodiment, the communications unit 503 may be further configured to send a second message to the first network device, to request to switch from the indirect connection path to the direct connection path. In addition, the communications unit 503 may be further configured to receive the sixth message sent by the first network device.

Herein, the sixth message may include at least one of the following: the cell identity, the random access configuration information, the first instruction information, or the first time value, and is used to configure the second terminal to switch from the indirect connection path to the direct connection path. The first instruction information may be used to instruct the second terminal whether to perform, before disconnecting from the first terminal, downlink synchronization with a cell corresponding to the cell identity. The first time value may be a longest time allowed for the second terminal to access the cell corresponding to the cell identity.

In an optional embodiment, the communications unit 503 may be further configured to trigger a radio resource control connection reestablishment process after receiving the fourth message.

In an optional embodiment, the communications unit 503 may be further configured to connect, by the second terminal, to the serving cell of the first terminal, and send a terminal device identifier to the first network device. The terminal device identifier may be a C-RNTI of the second terminal, or a C-RNTI of the first terminal and a local identifier of the second terminal. Specifically, the terminal device identifier may be carried in the fourth message. Alternatively, the terminal device identifier may be sent to the second terminal by the first terminal before the first terminal sends the fourth message.

It can be understood that, for specific implementations of the first terminal 400, the second terminal 500, the first network device 600, and the second network device 700 in Solution 2, reference may be made to the embodiments in FIG. 8 to FIG. 11, or the embodiment in FIG. 13, and another implementation related to Solution 2. Details are not described herein again.

According to the technical solutions provided in this application, in relay communication, when a relay device becomes unable to provide a relay service for a remote terminal, the relay device may trigger switching of the remote terminal from an indirect connection path for communicating with a network device by using the relay device to a direct connection path for direct communicating with the network device, and release a short-distance link between the relay terminal and the remote terminal. In this way, the relay device can quickly trigger path switching of the remote terminal based on a status of the relay device in a timely manner, and even can implement the path switching without interrupting data communication over a sidelink, thereby ensuring that data communication between the remote terminal and the network device is not interrupted.

A person of ordinary skill in the art may understand and implement all or some of the processes of the methods in the embodiments. The processes may be implemented by a computer program instructing relevant hardware. The program may be stored in a computer-readable storage medium. When the program is run, the processes of the methods in the embodiments are performed. The foregoing storage medium includes any medium that can store program code, such as a ROM, a random access memory RAM, a magnetic disk, or an optical disc.

What is claimed is:

1. A path switching method, comprising:
sending, by a relay terminal, a first message to a first network device, wherein the first message includes a request to switch a remote terminal from an indirect connection path for communicating with the first network device through the relay terminal to a direct connection path for communicating directly with the first network device or a second network device, or the first message includes a request to release a link between the relay terminal and the remote terminal, and the first network device is different from the second network device; and
in response to the first message, releasing, by the-relay terminal, the link between the relay terminal and the remote terminal;
wherein the releasing, by the relay terminal, the link between the relay terminal and the remote terminal comprises:
releasing, by the-relay terminal, the link after receiving a third message, wherein the third message is sent by the first network device or the remote terminal after the first network device sends a second message to the remote terminal, and is used to instruct the relay terminal to release the link,
wherein the second message comprises at least one of the following: a cell identity, random access configuration information, first instruction information, or a first time value, and is used to configure the remote terminal to switch from the indirect connection path to the direct connection path,
wherein the first instruction information is used to instruct the remote terminal whether to perform, before disconnecting from the relay terminal, downlink synchronization with a cell corresponding to the cell identity, and the first time value is a longest time allowed for the remote terminal to access the cell corresponding to the cell identity.

2. A communication method, comprising:

receiving, by a first network device, a first message originated and sent by a relay terminal, wherein the first message includes a request to switch a remote terminal from an indirect connection path for communicating with the first network device through the relay terminal to a direct connection path for communicating directly with the first network device or a second network device, or the first message includes a request to release a link between the relay terminal and the remote terminal, and the first network device is different from the second network device; and sending, by the first network device, a second message to the remote terminal, wherein the second message is operative to configure the remote terminal to switch from the indirect connection path to the direct connection path.

3. The method according to claim 2, wherein the second message comprises at least one of the following: a cell identity, random access configuration information, first instruction information, or a first time value, wherein the first instruction information is operative to instruct the remote terminal whether to perform, before disconnecting from the relay terminal, downlink synchronization with a cell corresponding to the cell identity, and the first time value is a longest time allowed for the remote terminal to access the cell corresponding to the cell identity.

* * * * *

UNITED STATES PATENT AND TRADEMARK OFFICE
CERTIFICATE OF CORRECTION

PATENT NO. : 11,419,025 B2
APPLICATION NO. : 16/635764
DATED : August 16, 2022
INVENTOR(S) : Haibo Xu et al.

It is certified that error appears in the above-identified patent and that said Letters Patent is hereby corrected as shown below:

In the Claims

In Column 32, Line 44, in Claim 1, delete "the-relay" and insert -- the relay --.

In Column 32, Line 50, in Claim 1, delete "the-relay" and insert -- the relay --.

Signed and Sealed this
Twenty-fifth Day of October, 2022

*Katherine Kelly Vidal*

Katherine Kelly Vidal
*Director of the United States Patent and Trademark Office*